US011815417B2

(12) United States Patent
Garrec

(10) Patent No.: US 11,815,417 B2
(45) Date of Patent: Nov. 14, 2023

(54) FORCE SENSOR FOR CABLE ACTUATOR

(71) Applicant: COMMISSARIAT A L'ENERGIE ATOMIQUE ET AUX ENERGIES ALTERNATIVES, Paris (FR)

(72) Inventor: Philippe Garrec, Gif sur Yvette (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 624 days.

(21) Appl. No.: 16/801,723

(22) Filed: Feb. 26, 2020

(65) Prior Publication Data

US 2021/0262876 A1   Aug. 26, 2021

(51) Int. Cl.
*G01L 5/06* (2006.01)
*F16H 25/20* (2006.01)
(Continued)

(52) U.S. Cl.
CPC .............. *G01L 5/06* (2013.01); *B25J 13/088* (2013.01); *F16H 25/2015* (2013.01);
(Continued)

(58) Field of Classification Search
CPC ......... G01L 5/06; G01L 1/00; F16H 25/2015; G01D 5/142; G01D 5/16; G01S 15/08;
(Continued)

(56) References Cited

U.S. PATENT DOCUMENTS 4,637,738 A * 1/1987 Barkley ................ F16C 29/001
384/7
5,319,434 A * 6/1994 Croteau ................ G01S 17/10
356/28.5
(Continued)

FOREIGN PATENT DOCUMENTS

WO    WO-2019029976 A1 * 2/2019 ................ B66F 3/08

OTHER PUBLICATIONS

P. Garrec, J. P. Friconneau, Y. Measson and Y. Perrot, "ABLE, an innovative transparent exoskeleton for the upper-limb," 2008 IEEE/RSJ International Conference on Intelligent Robots and Systems, 2008, pp. 1483-1488, doi: 10.1109/IROS.2008.4651012. (Year: 2008).*

(Continued)

*Primary Examiner* — Natalie Huls
*Assistant Examiner* — Cynthia L Davis
(74) *Attorney, Agent, or Firm* — Sughrue Mion, PLLC

(57) ABSTRACT

An actuator having a nut (4) co-operating with a screw (2); a first cable (6) coupled to the nut and functionally connected to an output (16, 17, 22.4) of the actuator (100); and a motor (3) arranged to drive the screw (2) in rotation. The actuator also has a mechanism (92) for comparing the actual position of the nut relative to the frame (10) with a theoretical position for the nut relative to the frame (10) in order to obtain a position deviation (δang4, δlin4) of the nut; and a mechanism (93) for determining a force applied to the output (22.4) of the cable actuator (100) as a function of the position deviation of the nut. Also disclosed is a method of measuring a force applied to an output (16, 17, 24.1) of an actuator (100), and to a method of determining prior loading (t6,9) of a cable actuator (100).

25 Claims, 15 Drawing Sheets

(51) Int. Cl.
| | |
|---|---|
| *G01D 5/14* | (2006.01) |
| *G01D 5/26* | (2006.01) |
| *B25J 13/08* | (2006.01) |
| *G01L 1/00* | (2006.01) |
| *G01S 17/08* | (2006.01) |
| *G01D 5/16* | (2006.01) |
| *G01S 15/08* | (2006.01) |

(52) U.S. Cl.
CPC ............... *G01D 5/142* (2013.01); *G01D 5/26* (2013.01); *G01L 1/00* (2013.01); *F16H 2025/2075* (2013.01); *G01D 5/16* (2013.01); *G01S 15/08* (2013.01); *G01S 17/08* (2013.01)

(58) Field of Classification Search
CPC ........ G01S 17/08; B25J 13/00; Y10T 403/45; Y10T 403/608; Y10T 403/40; Y10T 403/405; F16C 3/06; F16C 3/04
See application file for complete search history.

(56) References Cited

U.S. PATENT DOCUMENTS

2019/0048988 A1\* 2/2019 Besser .................... F16H 57/01
2020/0172383 A1\* 6/2020 Garrec ...................... B66F 3/08

OTHER PUBLICATIONS

Popovic, R. S., Drljaca, P. M., Schott, C., & Racz, R. (2001). Integrated Hall sensor/flux concentrator microsystems. Informacije Midem-Ljubljana—, (4), 215-219. (Year: 2001).\*

Edward Ramsden, Hall-Effect Sensors (Second Edition), 2006, p. 107-115 (Year: 2006).\*

Bosch Rexroth AG, Technical Data Sheet, Linear sets with torque-resistant compact linear bushings, (Year: 2015).\*

Alexander Slocum—Fundametals of Design, Jan. 1, 2008, p. 12-17 (Year: 2008).\*

David Nyce, Position Sensors, 2016, p. 13-14, 45-48, 147, (Year: 2016).\*

\* cited by examiner

FORCE SENSOR FOR CABLE ACTUATOR

FIELD OF THE INVENTION

The invention relates to a force sensor for a cable actuator comprising a screw-and-nut assembly in which the screw is movable in translation and is coupled by a cable to an element that is to be moved. More particularly, the invention relates to a force sensor for a cable actuator in which the cable performs an anti-rotation function of preventing the nut from turning relative to the screw.

BACKGROUND OF THE INVENTION

Cable actuators are known that comprise a screw mounted on a frame and a nut co-operating with the screw. The nut is associated with anti-rotation means so that relative rotation between the screw and nut causes the nut to move axially. One or more cables associated with the nut are connected to an output of the actuator, which output may be rotary (when the cables are connected to pulleys) or linear (when the cables are connected directly to the load that is to be handled).

Force sensors for such an actuator are generally mounted directly on the output of the actuator, and they are found to be bulky, expensive, and/or not very accurate. Also, since such force sensors are coupled directly to segments of the articulated arm, they are subjected to impacts and vibration coming from the segments and the loads that they support. In order to avoid them being excessively fragile, they must therefore be over-dimensioned, which increases their volume and reduces their sensitivity. Thus, even though cable actuators present characteristics that are advantageous, in particular in terms of compactness, it is difficult or expensive to provide them with force control, which restricts their widespread use.

OBJECT OF THE INVENTION

An object of the invention is to improve the accuracy and the cost of manufacturing and/or maintaining a cable actuator.

BRIEF DESCRIPTION OF THE INVENTION

For this purpose, there is provided a cable actuator comprising a frame, a screw rotatably mounted on the frame and extending along a first axis, a nut co-operating with the screw, a first cable coupled to the nut and functionally connected to an output of the actuator, a second cable coupled to the nut and functionally connected to the output of the actuator, and a motor arranged to drive the screw in rotation. The first cable is arranged to exert forces opposing the nut being driven in rotation by the screw so as to constitute anti-rotation means such that rotation of the screw or of the nut under drive from the motor causes the nut to move along the screw. The actuator of the invention includes means for determining the actual position of the nut relative to the frame, means for comparing the actual position of the nut relative to the frame with a theoretical position for nut relative to the frame in order to obtain a position deviation of the nut, and means for determining a force applied to the output of the actuator as a function of the position deviation of the nut.

An actuator is thus obtained in which the force applied to the output is measured by using a device that is simple and that relies on position measurement means, where such means are generally more reliable than known force sensors. The actuator of the invention also benefits from the amplification factor induced by the pitch of the screw on the movement of the nut subjected to the load applied to the output of the actuator.

Advantageously, the position deviation of the nut is an angular deviation measured about the first axis. Reliable detection of the actual position of the nut is possible when the means for determining the actual position of the nut relative to the frame comprise a linear magnetic core secured to the frame and magnetic field induction means connected to the nut.

Measurement reliability is improved when the means for determining the actual position of the nut relative to the frame comprise a reflector secured to the frame and a distance sensor connected to the nut. Measurement reliability is further improved when the distance sensor comprises a wave transceiver.

In a particular embodiment, the means for determining the actual position of the nut relative to the frame comprise a distance sensor secured to the frame and a target connected to the nut. Measurement reliability is further improved when the distance sensor comprises a wave transceiver.

The actuator is disturbed little by ambient light when the means for determining the actual position of the nut relative to the frame comprise a magnetic sensor and a plurality of magnetic poles secured to the nut. In haptic operation, it is possible to reproduce textures when the actuator includes a magnetic exciter for applying a force to at least one magnetic pole.

An inexpensive and reliable embodiment is obtained when the means for determining the actual position of the nut relative to the frame comprise a mechanical coupling connecting a first element connected to the frame with a second element secured to the nut, the first element comprising:

- a third shaft mounted on the frame to rotate about an axis substantially parallel to the first axis;
- a bushing slidably mounted on the third shaft and provided with means for preventing relative rotation between the bushing and the third shaft; and
- a rotary encoder constrained to rotate with the third shaft.

The sensitivity of the actuator to vibration is reduced when the mechanical coupling includes a flexible link or indeed the flexible link comprises a first end provided with a ball joint connection with one of the first and second elements, the flexible link having a second end that has a fixed connection with the other one of the first and second elements. Also advantageously, the mechanical coupling comprises a rigid connecting rod having a first end provided with a ball joint connection with one of the first and second elements, the connecting rod having a second end provided with a pivot connection with the other one of the first and second elements.

In a particularly advantageous embodiment, the mechanical coupling comprises a first branch having a first end connected by a ball joint connection to a first end of a second branch, the first branch having a second end secured to one of the first and second elements, and the second branch having a second end secured to the other one of the first and second elements, the second branch including a telescopic portion.

Advantageously, the rotary encoder possesses a motor mode in order to apply an excitation force to the nut.

In a particular embodiment, the position deviation of the nut is a linear deviation measured along the first axis. Under such circumstances, the means for determining the actual position of the nut relative to the frame may comprise a distance sensor having a wire winder secured to the frame, one end of its wire being connected to the nut. Alternatively, the means for determining the actual position of the nut relative to the frame may comprise a distance sensor secured to the frame and a target connected to the nut. Advantageously, the distance sensor possesses a motor mode in order to apply an excitation force to the nut.

The cable actuator of the invention may be an actuator in which the output of the actuator is a shaft rotatably mounted on the frame, or in which the output of the actuator is slidably mounted on the frame.

The invention also provides a measurement method for measuring a force applied at the output of a cable actuator comprising a frame, a screw mounted on the frame and extending along a first axis, a nut co-operating with the screw, and a first cable coupled to the nut and functionally connected to an output of the actuator. The actuator also comprises a motor arranged to drive the screw in rotation, the first cable being arranged to exert forces opposing the nut being driven in rotation by the screw so as to constitute anti-rotation means such that rotation of the screw under drive from the motor causes the nut to move along the screw. The measurement method for measuring a force comprises the following steps:
  determining the actual position of the nut relative to the frame;
  comparing the actual position of the nut relative to the frame with a theoretical position for the nut relative to the frame in order to obtain a position deviation of the nut; and
  determining a force applied to the output of the actuator as a function of the position deviation of the nut.

The measurement method is equally applicable to a situation in which the position deviation is an angular deviation about the first axis and to a situation in which the position deviation is a linear deviation along the first axis.

The invention also provides a method of determining prior loading of a cable actuator comprising a frame, a screw mounted on the frame and extending along a first axis, a nut co-operating with the screw, a first cable coupled to the nut and functionally connected to the output of the actuator, and a motor arranged to drive the screw in rotation, the first cable being arranged to exert forces opposing the nut being driven in rotation by the screw so as to constitute anti-rotation means such that rotation of the screw under drive from the motor causes the nut to move along the screw. The method of measuring the prior loading comprises the following steps:
  bringing the nut to a predetermined position relative to the frame;
  holding the output of the cable actuator stationary;
  controlling the motor so that it applies a predetermined torque to the screw;
  determining the actual position of the nut relative to the frame;
  comparing the actual position of the nut relative to the frame with the predetermined position for the nut relative to the frame in order to obtain a position deviation of the nut; and
  determining the prior loading of the first cable as a function of the position deviation of the nut.

Other characteristics and advantages of the invention appear on reading the following description of particular, nonlimiting embodiments of the invention.

BRIEF DESCRIPTION OF THE DRAWINGS

Reference is made to the accompanying figures, in which.

DETAILED DESCRIPTION OF THE INVENTION

Figure 1:
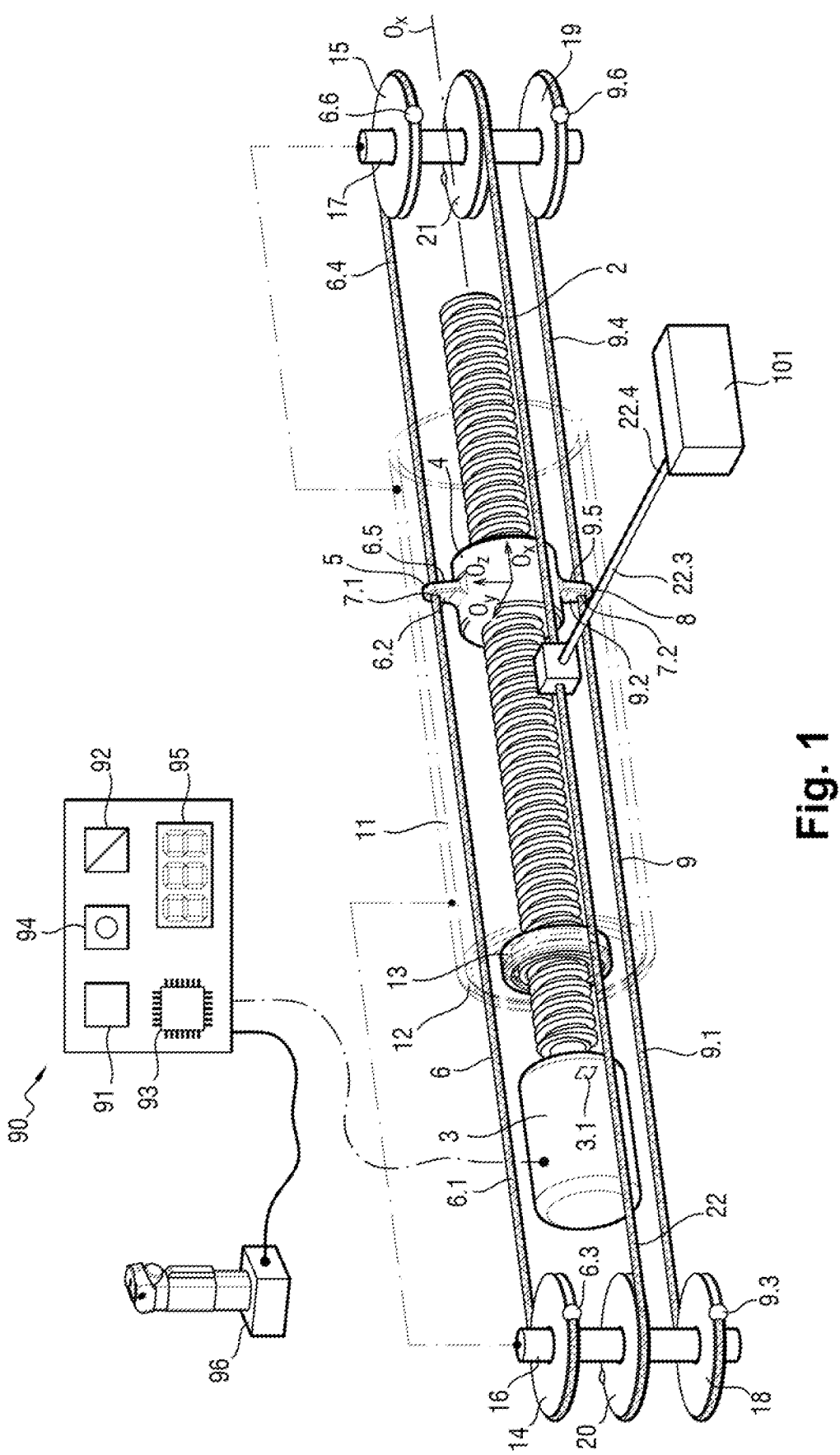
FIG. 1 is a diagrammatic fragmentary perspective view of a cable actuator of the invention.

With reference to FIG. 1, the actuator of the invention, given overall reference 100, comprises a frame 10, in this example a portion of a right cylinder 11 including a base 12 having a bearing 13 at its center that receives a screw 2 to rotate about a horizontal first axis Ox. The screw 2 is a ball screw of pitch $p_2$ that is driven in rotation by an electric motor 3 having a first rotary encoder 3.1. A nut 4 co-operates with the screw 2 and includes a first eyelet 5 projecting radially from the nut 4. A first cable 6 extends parallel to the first axis Ox and includes a first segment 6.1 held at its first end 6.2 in the first eyelet 5 by a first collet 7.1. The second end 6.3 of the first segment 6.1 of the first cable 6 is crimped on a first pulley 14 secured to a first shaft 16 mounted on the frame 10 to rotate about an axis perpendicular to the first axis Ox. The first cable 6 also has a second segment 6.4 of the first cable 6 that extends parallel to the first axis Ox on the other side of a plane P orthogonal to the first axis Ox and containing the first eyelet 5, and it is held at its first end 6.5 in the first eyelet 5 by the first collet 7.1. The second end 6.6 of the second segment 6.4 of the first cable 6 is crimped on a second pulley 15 secured to a second shaft 17 mounted on the frame 10 to rotate about an axis perpendicular to the first axis Ox.

The nut 4 has a second eyelet 8 projecting radially from the nut 4 so as to be diametrically opposite the first eyelet 5.

A second cable 9 extends parallel to the first axis Ox and comprises a first segment 9.1 of the second cable 9 that is held at its first end 9.2 in the second eyelet 8 by a second collet 7.2. The second end 9.3 of the first segment 9.1 of the second cable 9 is connected to a third pulley 18 secured to the first shaft 16 mounted on the frame 10 to rotate about an axis perpendicular to the first axis Ox.

The second cable 9 also has a second segment 9.4 extending parallel to the first axis Ox on the other side of a plane P orthogonal to the first axis Ox and containing the second eyelet 8, and it is held at its first end 9.5 in the first eyelet 8 by the second collet 7.2. The second end 9.6 of the second segment 9.4 of the second cable 9 is crimped on a fourth pulley 19 secured to the second shaft 17 mounted on the frame 10 to rotate about an axis perpendicular to the first axis Ox.

Each of the first and second cables 6 and 9 has respective prior loading at a prior loading tension t6,9 equal to half of the total prior loading tension $t_0$, e.g. by acting on the distance between the first shaft 16 and the second shaft 17.

The actuator 100 also includes a fifth pulley 20 and a sixth pulley 21 that are secured to rotate respectively with the first shaft 16 and with the second shaft 17. A third cable 22 extends between the fifth pulley 20 and the sixth pulley 21 and it includes a first end 22.1 crimped to the fifth pulley 20 and a second end 22.2 crimped to the sixth pulley 21.

A support 22.3 is crimped on the third cable 22 in order to constitute an output 22.4 of the actuator 100 that is for connection to a load 101 that is to be moved.

The motor 3 and its encoder 3.1 are connected to a monitoring and control unit 90 comprising a unit 91 for determining the position of the nut 4, a comparator 92, calculation means 93, a memory 94, and a display 95. A control handle 96 is also connected to the control unit 90.

Since the first cable 6 and the second cable 9 are under tension, they act, in both travel directions of the nut 4 relative to the screw 2, to exert forces that oppose the nut 4 being driven in rotation by the screw 2 while the motor 3 is rotating. In addition to their function of transmitting movement forces from the nut 4 to the load 101, they thus also perform an anti-rotation function so as to ensure that rotation of the screw 2 as driven by the motor 3 causes the nut 4 to move relative to the screw 2. The cable actuator 100 of the invention enables the load 101 to be moved in two opposite directions.

Figure 2:
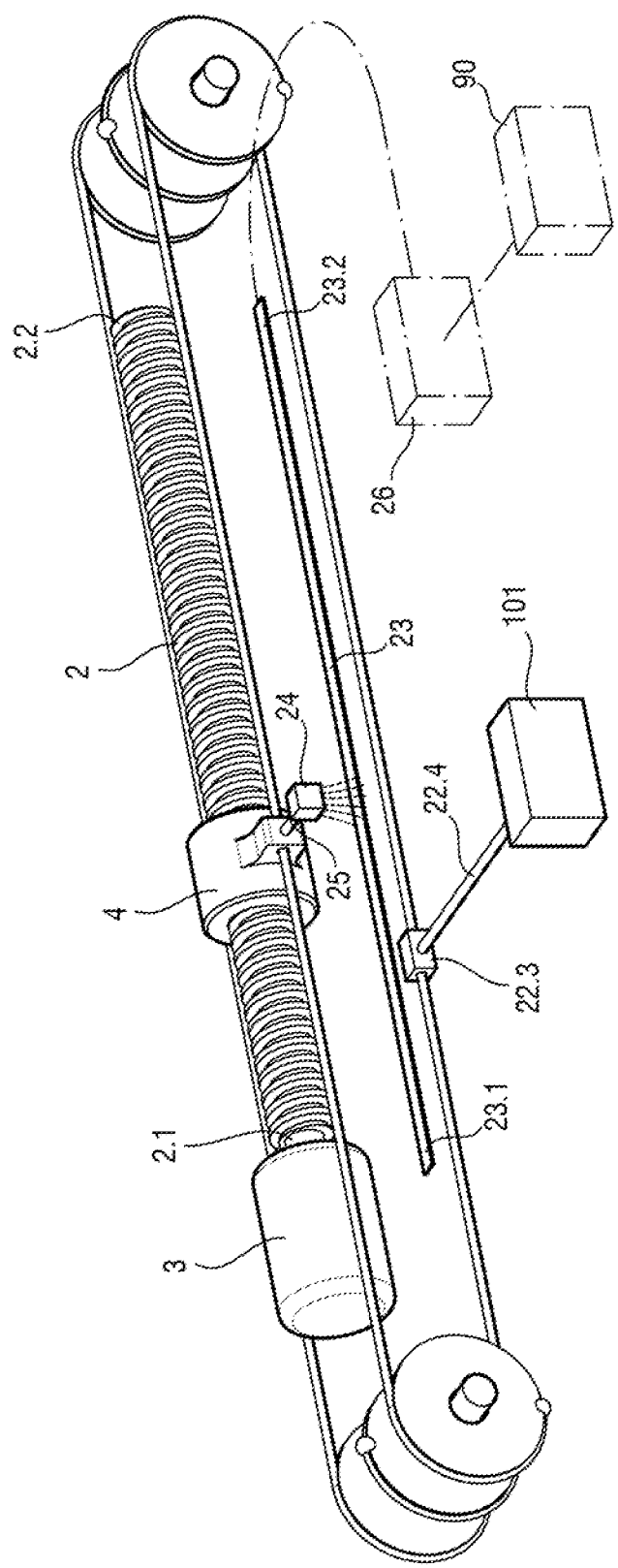
FIG. 2 is a diagrammatic perspective view of a first embodiment of the invention.

As shown in FIG. 2, in a first embodiment of the invention, a linear magnetic core—in this example a bar 23 made of ferrous material—is secured to the frame 10 so as to extend along a direction that is substantially parallel to the axis Ox. The first end 23.1 of the bar 23 lies substantially in register with a first end 2.1 of the screw 2, and the second end 23.2 of the bar 23 lies substantially in register with a second end 2.2 of the screw 2. A neodymium magnet 24 is connected to the nut 4 by a first rod 25 so as to be located substantially in register with the bar 23. A processor module 26 connected to the bar 23 uses the Hall effect to measure the magnetic field generated by the position of the magnet 24 relative to the bar 23, and it converts the measured magnetic field into an estimate of the distance $D_{23\text{-}24}$ between the magnet 24 and the bar 23.

The module 26 is connected to the monitoring and control unit 90.

In operation, a user acts on the handle 96 in order to control movement of the load 101. The control unit 90 then causes the motor 3 to rotate. Under drive from the motor 3, rotation of the screw 2 gives rise to identical rotation of the nut 4 as a result of contact friction between the screw 2 and the nut 4. This rotation tensions the first and second cables 6 and 9, which then exert forces opposing the nut 4 being turned by the screw 2. In addition to their function of transmitting movement forces to the load 101, the first cable 6 and the second cable 9 thus also perform an anti-rotation function so as to ensure that rotation of the screw 2 as driven by the motor 3 causes the nut 4 to move relative to the screw 2.

When the load 101 reaches the position desired by the user, the user ceases to act on the control 96. During a first step, the unit 91 determines a theoretical position for the nut 4 on the screw 2 on the basis of the number N of revolutions performed by the motor as measured by the encoder 3.1. The unit 91 thus establishes a theoretical linear position for the nut 4 on the screw 2 along the first axis Ox, and also a theoretical angular position for the nut 4 about the first axis Ox. The theoretical linear position of the nut 4 on the screw 2 corresponds to the position that the nut 4 would occupy on the screw 2 along the first axis Ox after a number N of revolutions without load, i.e. for a load 101 of zero weight. The theoretical angular position of the nut 4 about the axis Ox corresponds to the position that the nut 4 would occupy on the screw 2 about the axis Ox after a number N of revolutions without load, i.e. for a load 101 of zero weight. This theoretical angular position may vary as a function of the theoretical linear position of the nut 4 on the screw 2. For convenience of description, it is assumed that the angular and linear positions are measured in a rectangular reference frame (Ox, Oy, Oz) tied to the nut 4.

The module 26 transmits the estimated value for the distance $D_{23\text{-}24}$ to the calculation means 93, which convert this value into an actual angular position of the nut 4 about the axis Ox. The comparator 92 compares the actual angular position of the nut 4 about the axis Ox with the theoretical angular position for the nut about the axis Ox, and by subtraction, the comparator obtains a value $\delta_{ang4}$ for the deviation of the angular position of the nut 4.

The calculation means 93 then determine the force being applied to the support 22.3 by the load 101 as a function of the value $\delta_{ang4}$ for the deviation of the angular position of the nut 4.

This determination may be performed in particular by solving the following nut equilibrium equation 27:

[Math 1]
$$C = \frac{2RE\rho^2 \sin\alpha}{(d-\overline{p}\alpha)(E-d+\overline{p}\alpha)} \times \frac{\sqrt{2\rho^2(1-\cos\alpha)+(d-\overline{p}\alpha)^2}+\sqrt{2\rho^2(1-\cos\alpha)+(E-d+\overline{p}\alpha)^2}-E+2^{-1}(k_1^{-1}+k_2^{-1})t_0}{k_1^{-1}\left(\frac{\rho^2\sin\alpha}{E-d+\overline{p}\alpha}+\overline{p}\right)\sqrt{\frac{2\rho^2(1-\cos\alpha)}{(d-\overline{p}\alpha)^2}+1}-k_2^{-1}\left(\frac{\rho^2\sin\alpha}{d-\overline{p}\alpha}-\overline{p}\right)\sqrt{\frac{2\rho^2(1-\cos\alpha)}{(E-d+\overline{p}\alpha)^2}+1}}$$

where:
- C corresponds to the torque applied to the first pulley 14;
- R corresponds to the radius of the first pulley 14;
- E corresponds to the distance between the points of tangency of the first cable 6 with the first pulley 14 and with the second pulley 15;
- $\alpha$ corresponds to the angle of rotation of the nut 4 relative to the frame 10;
- $\rho$ corresponds to the anchor radius of the first cable 6 relative to the axis of the nut 4 (or of the screw);
- d corresponds to the distance from the center of the nut 4 to the point of tangency of the first cable 6 with the first pulley 14;
- $\bar{p}$ corresponds to the screw thread of the system comprising the screw 2 and the nut 4, i.e. $p2/2\pi$;
- $k_1$ corresponds to the stiffness of the strand of the first cable 6 that is the shorter of the strands between the nut 4 and the first pulley 14 and between the nut 4 de la and the second pulley 15;
- $k_2$ corresponds to the stiffness of the strand of the second cable 9 there is the longer of the strands between the nut 4 and the first pulley 14 and between the nut 4 and the second pulley 15; and
- $t_0$ corresponds to the total prior loading tension shared between the first and second cables 6 and 9.

The approximations leading to this equation or enabling it to be solved (e.g. limited developments) may depend on the linear position of the nut 4 on the screw 2.

This results in a cable actuator 100 in which the pair constituted by the magnet 24 and the core 23 serves to estimate the tensions in the first cable 6 and in the second cable 9, and thus to deduce therefrom the force being exerted on the output 22.4 of the actuator 100.

The actuator 100 in the first embodiment of the invention also makes it possible to verify the prior loading of the cables. Specifically, the total prior loading $t_0$ shared between the first cable 6 and the second cable 9 appears in the above equilibrium equation, so it is thus possible to evaluate this prior loading to by using the following method.

Figure 3:
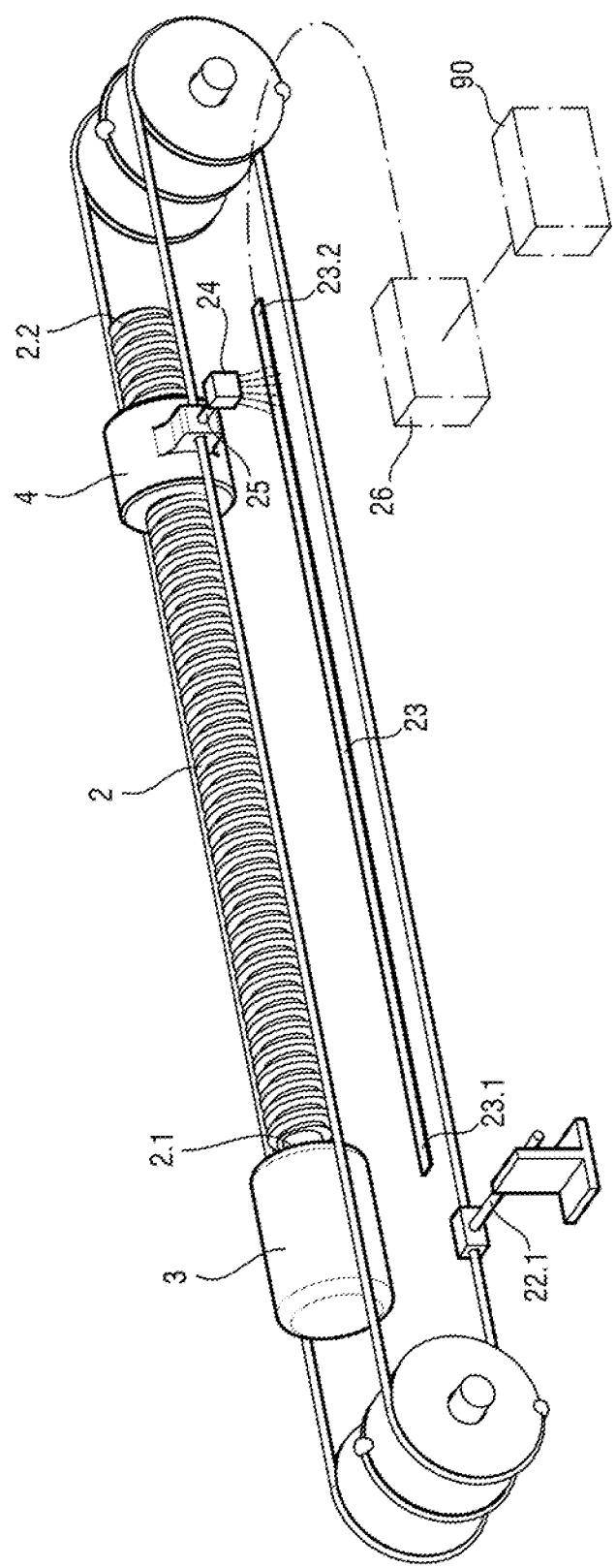
FIG. 3 is a diagrammatic perspective view of a method of the invention for determining a prior loading of a cable.

In a first step (FIG. 3), the nut is taken to a predetermined position relative to the frame, and in this example to the second end 2.2 of the screw 2.

In a second step, the support 22.3 is held stationary by bringing it into abutment against an element that is stationary relative to the frame 10.

In a third step, the motor 3 is controlled so as to apply a predetermined torque $C_p$ to the screw 2. In this example, the torque $C_p$ is applied by applying a known feed current $I_p$ to the motor 3, with the value of the torque applied by the motor 3 to the screw 2 being determined from the characteristic associating feed current with the torque output by the motor 3.

In a fourth step, the module 26 transmits the estimated value for the distance $D_{23-24}$ to the calculation means 93, which convert this value into an actual angular position of the nut 4 about the axis Ox.

In a fifth step, the comparator 92 compares the actual position of the nut 4 relative to the frame 10 with the predetermined position for the nut 4 relative to the frame 10 in order to obtain a value $\delta_{ang4}$ for the deviation of the angular position of the nut 4.

In a sixth step, the calculation means 93 determine the value of the total prior loading to shared between the first and second cables 6 and 9 as a function of the value $\delta_{ang4}$ for the deviation of the angular position of the nut 4.

The value determined for the prior loading to makes it possible to verify that it does indeed comply with a reference value $t_{0ref}$.

In the following description of thirteen other embodiments of the invention, elements that are identical or analogous to those described above are given the same numerical references.

Figure 4:
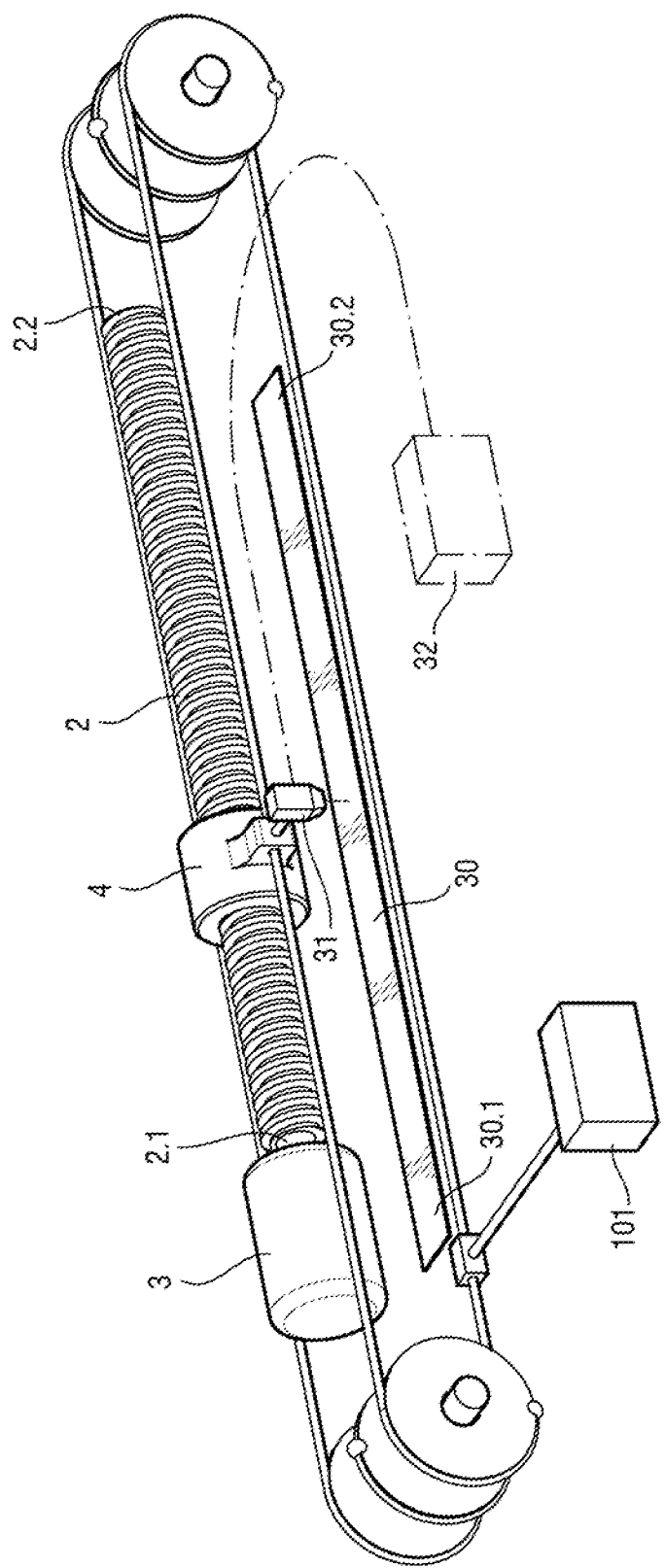
FIG. 4 is a diagrammatic perspective view of a second embodiment of the invention.

In a second embodiment as shown in FIG. 4, a reflector 30, specifically a white-metal sheet, is secured to the frame 10 and extends in a direction that is substantially parallel to the axis Ox. The first end 30.1 of the reflector 30 lies substantially in register with the first end 2.1 of the screw 2, and the second end 30.2 of the reflector 30 lies substantially in register with the second end 2.2 of the screw 2. A laser transceiver 31 is connected to the nut 4 by the first rod 25 so as to be substantially in register with the reflector 30.

A processor module 32 connected to the laser transceiver 31 measures the travel time of a laser beam emitted by the transceiver 31 and reflected by the reflector 30, and converts the travel time into an estimate for the distance $D_{30-31}$ between the transceiver 31 and the reflector 30. The module 32 is connected to the unit 90 in which the calculation means 93 convert the distance $D_{30-31}$ into an actual angular position for the nut 4 about the axis Ox.

The force on the output 22.4 of the actuator 100 is determined in the same manner as described above for the first embodiment of the invention.

Figure 5:
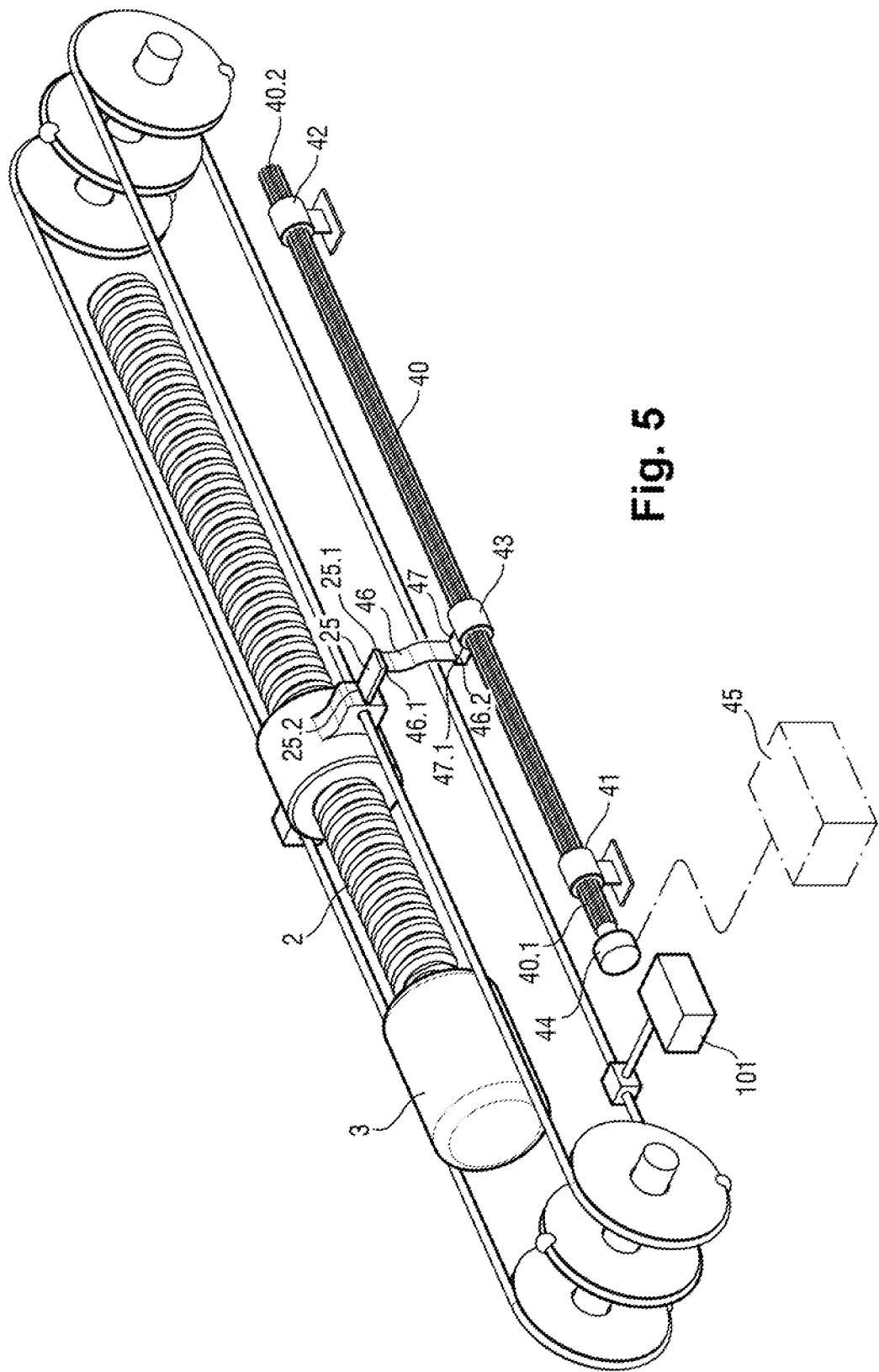
FIG. 5 is a diagrammatic perspective view of a third embodiment of the invention.

In a third embodiment as shown in FIG. 5, a third shaft 40 extends along an axis substantially parallel to the first axis Ox. The third shaft 40 is rotatably mounted on the frame 10 by means of a first ball bearing 41 positioned at a first end 40.1 of the third shaft 40 and by means of a second ball bearing 42 positioned at a second end 40.2 of the third shaft 40. The third shaft 14 is a fluted ball shaft having a bushing 43 slidably mounted thereon. A second rotary encoder 44 constrained to rotate with the third shaft 40 is connected to a processor module 45, which is itself connected to the monitoring and control unit 90.

Figure 6:
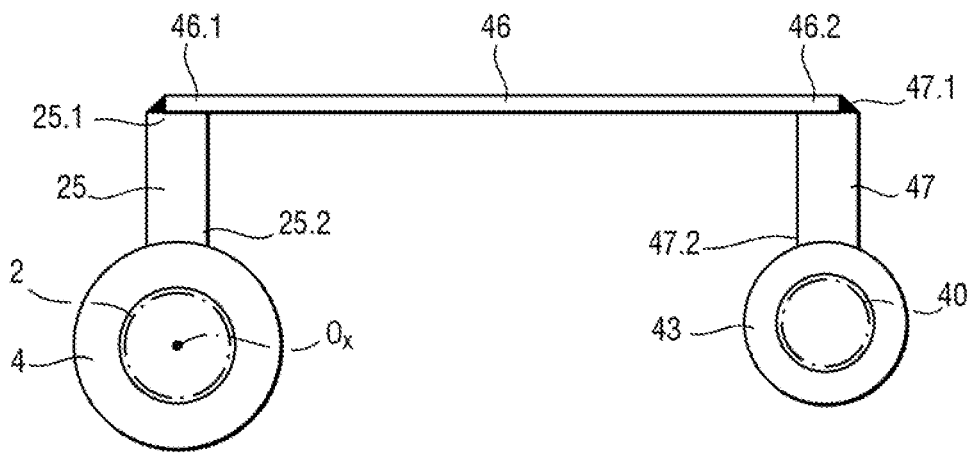
FIG. 6 is a diagrammatic detail view of the third embodiment of the invention in a first state.

As can be seen in FIG. 6, the first end 25.1 of the first rod 25 that is remote from the second end 25.2 secured to the nut 4 is itself welded to a first end 46.1 of a metal blade 46. The second end 46.2 of the blade 46 is welded to a first end 47.1 of the second rod 47. The second end 47.2 of the second rod 47 is welded to the bushing 43.

Figure 7:
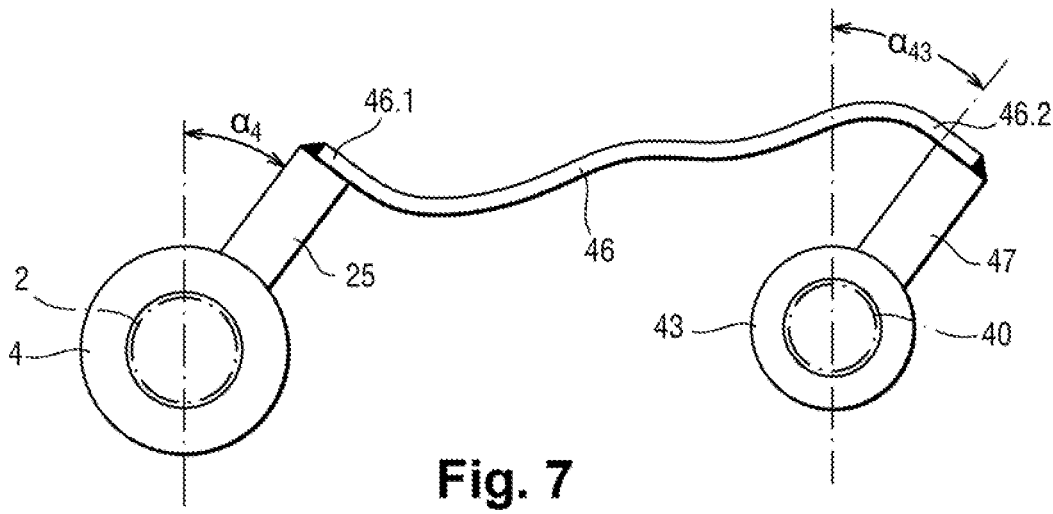
FIG. 7 is a diagrammatic detail view of the third embodiment of the invention in a second state.

The blade 46 thus provides mechanical coupling connecting together the nut 4 and the shaft 40 so as to convey a rotation of the nut 4 through an angle $\alpha 4$ about the axis Ox as a matching rotation through an angle $\alpha 43$ of the bushing 43 about the axis of the shaft 40, which rotation is transmitted to the third shaft 40 (FIG. 7). The blade 46 presents flexibility appropriate for reproducibly conveying the angle $\alpha 4$ to the bushing 43. Specifically, the ratio associating $\alpha 4$ and $\alpha 43$ may be linear (e.g. constant) or variable if the blade is flexible. Nevertheless, such a ratio is determinable and reproducible, thus making it possible to deduce the value of a rotation through the angle $\alpha 4$ from the angle of rotation $\alpha 43$.

In operation, the angular position of the nut 4 is transmitted by the blade 46 to the bushing 43, which in turn transmits this angular position to the third shaft 40. The processor module 45 measures the rotation of the encoder 44 associated with the third shaft 40 and transmits it to the control unit 90. The comparator 92 of the control unit 90 compares the actual angular position of the nut 4 about the axis Ox with the theoretical angular position for the nut about the axis Ox, and by subtraction, the comparator 92 obtains a value $\delta_{ang4}$ for the deviation of the angular position of the nut 4.

The calculation means 93 then determine the force being applied to the support 22.3 by the load 101 as a function of the value $\delta_{ang4}$ for the deviation of the angular position of the nut 4 in the same manner as described above for the first embodiment of the invention.

Figure 8:
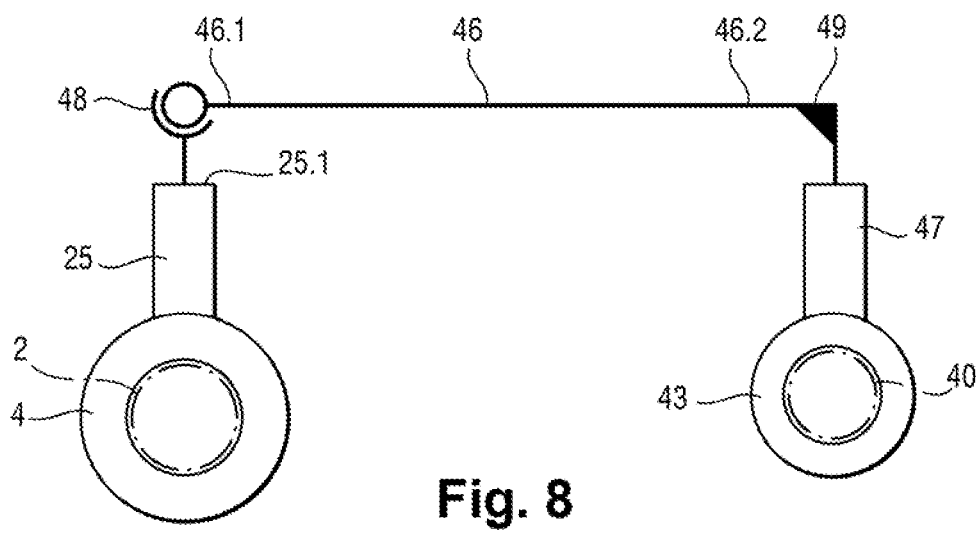
FIG. 8 is a diagrammatic detail view of a fourth embodiment of the invention.

In a fourth embodiment as shown in FIG. 8, the first end 46.1 of the blade 46 is provided with a ball joint 48 connecting it to the first end 25.1 of the first rod 25 secured to the nut 4. The second end 46.2 of the blade 46 is connected via a fixed connection 49 to the first end 47.1 of the second rod 47 connected to the bushing 43. The blade 46 thus enables the angular position of the nut 4 about the axis Ox to be copied to the bushing 43, and thus to the third shaft 40.

Figure 9:
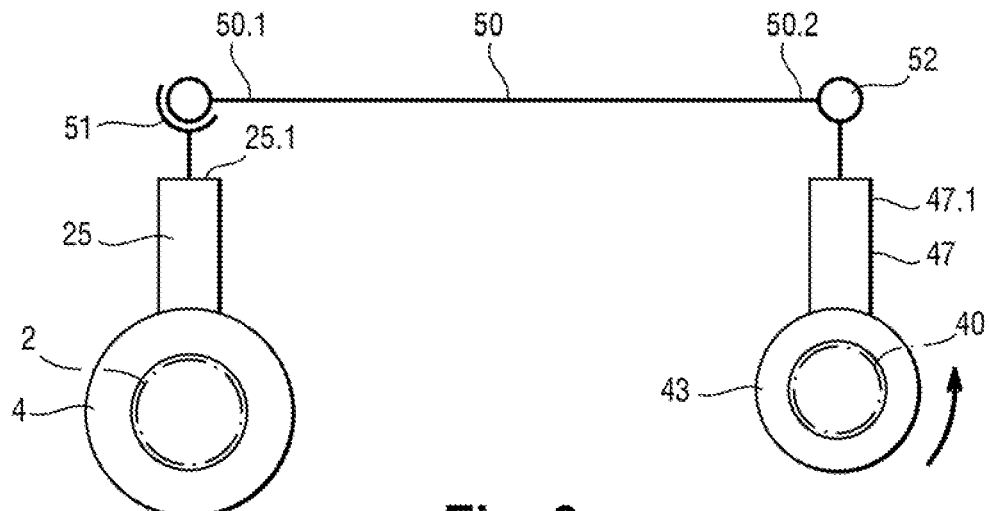
FIG. 9 is a diagrammatic detail view of a fifth embodiment of the invention in a first state.

In a fifth embodiment as shown in FIG. 9, the mechanical coupling between the nut 4 and the bushing 43 comprises a rigid connecting rod 50 having a first end 50.1 provided with a ball joint 51 connected to the first end 25.1 of the first rod 25 secured to the nut 4. The second end 50.2 of the rigid connecting rod 50 is provided with a pivot connection 52 about an axis substantially parallel to the axis Ox to the first end 47.1 of the second rod 47 connected to the bushing 43. The connecting rod 50 thus enables the angular position of the nut 4 about the axis Ox to be copied to the bushing 43, and thus to the third shaft 40.

Figure 10:
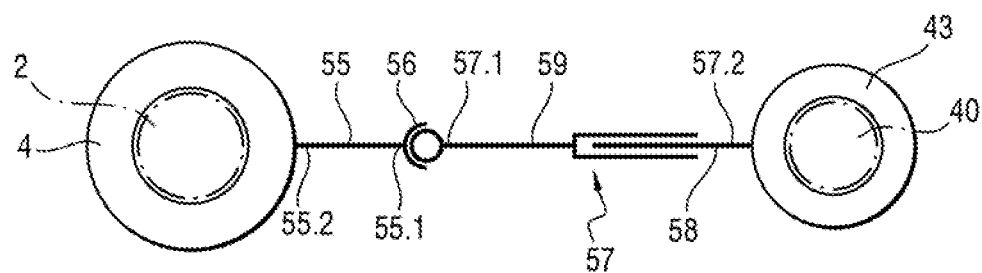
FIG. 10 is a diagrammatic detail view of a sixth embodiment of the invention in a first state.
Figure 11:
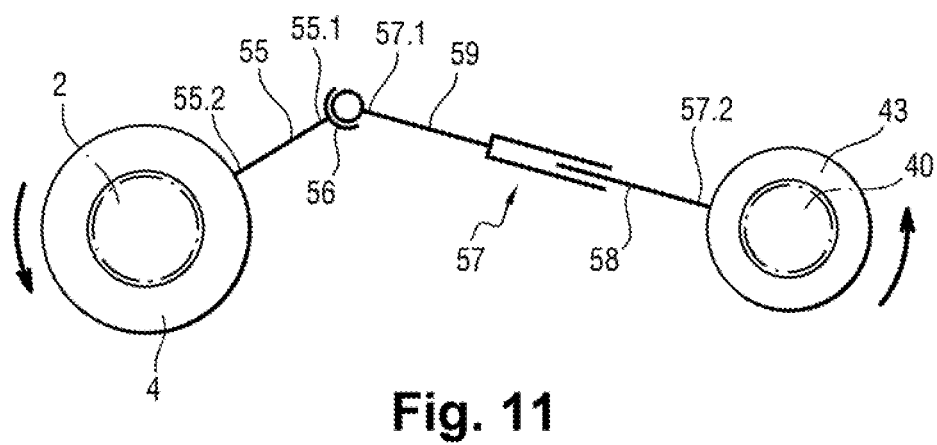
FIG. 11 is a diagrammatic detail view of a sixth embodiment of the invention in a second state.

In a sixth embodiment, as shown in FIGS. 10 and 11, the mechanical coupling between the nut 4 and the bushing 43 comprises a first branch 55 having a first end 55.1 connected by a ball joint 56 to a first end 57.1 of a second branch 57. The second end 55.2 of the second branch 55 is secured to the nut 4 and the second end 57.2 of the second branch 57 is secured to the bushing 43. The second branch 57 comprises a column 58 that is slidably mounted in a ball bushing 59. In this example, the first branch 55 and the second branch 57 lie in a plane that contains the axis Ox and the axis of the third shaft 40. FIG. 11 shows how the mechanical coupling in the fifth embodiment of the invention enables the angle of rotation of the nut 4 to be copied to the bushing 43 by the column 58 sliding in the ball bushing 59.

In addition to copying the angle of rotation of the nut 4 to the bushing 43, the degrees of freedom of the mechanical couplings in the third, fourth, fifth, and sixth embodiments of the invention also serve to filter the disturbing effects of any canting of the nut 4 relative to the screw 2 (e.g. mechanical oscillation, turning about an axis orthogonal to the axis Ox).

Figure 12:
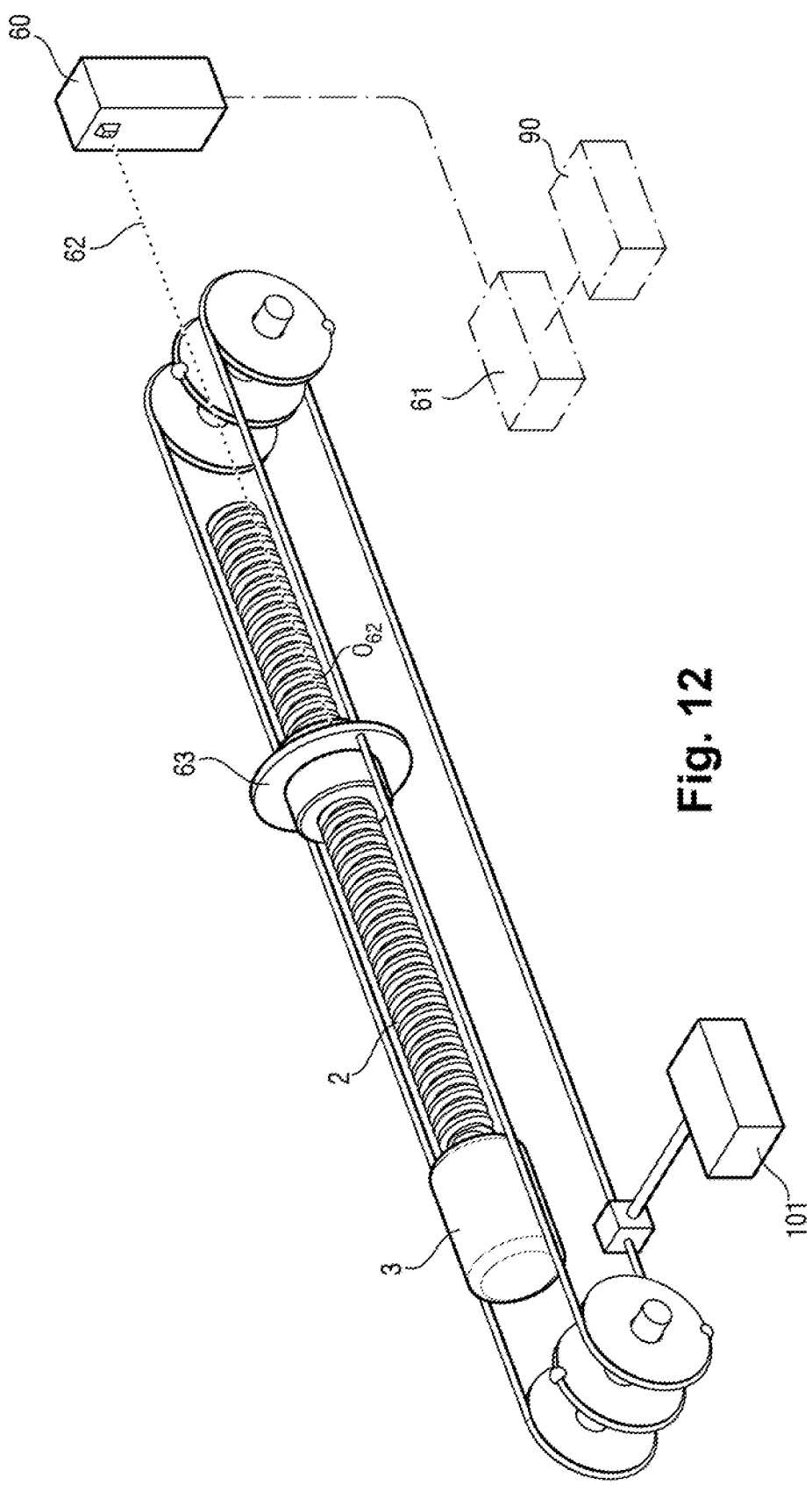
FIG. 12 is a diagrammatic detail view of a seventh embodiment of the invention.

In a seventh embodiment of the invention as shown in FIG. 12, a laser beam distance sensor 60 is secured to the frame 10. The distance sensor 60 is connected to a processor unit 61, itself connected to the control unit 90. The laser beam 62 of the distance sensor 60 extends in a direction $O_{62}$ that is substantially parallel to the first axis Ox. A reflective disk 63 projects radially from the nut 4. The distance sensor 60 is arranged so that the laser beam 62 is reflected by the disk 63.

In operation, during a first step, the unit 91 acts in real time to determine a theoretical position for the nut 4 on the screw 2 on the basis of the number N of revolutions performed by the motor as measured by the encoder 3.1. The unit 91 thus establishes a theoretical linear position for the nut 4 on the screw 2 along the axis Ox. The theoretical linear position of the nut 4 on the screw 2 corresponds to the position that would be occupied by the nut 4 along the axis Ox on the screw 2 after a number N of revolutions without load, i.e. for a load 101 of zero weight. For convenience of description, it is assumed that the angular and linear positions are measured in a rectangular reference frame (Ox, Oy, Oz) tied to the nut 4.

The processor unit 61 estimates the value of the distance $D_{60\text{-}63}$ between the distance sensor 60 and the disk 63. This estimate is communicated to the calculation means 93 of the monitoring and control unit 19, which means convert it into an actual linear position of the nut 4 on the screw 2 along the first axis Ox. The comparator 92 compares the actual linear position of the nut 4 along the first axis Ox with the theoretical linear position of the nut along the axis Ox, and by subtraction, the comparator obtains a value $\delta_{lin4}$ for the deviation of the linear position of the nut 4.

The calculation means 93 then determine the force being applied to the support 22.3 by the load 101 as a function of the value $\delta_{lin4}$ for the deviation of the linear position of the nut 4. The force being applied on the support 22.3 by the load 101 may be determined by combining the equilibrium equation 27 and the pitch p2 of the screw 2. Additional tribological analysis of the connection between the threads respectively of the nut 4 and of the screw 2 can then serve to further refine the estimate of the force.

Figure 13:
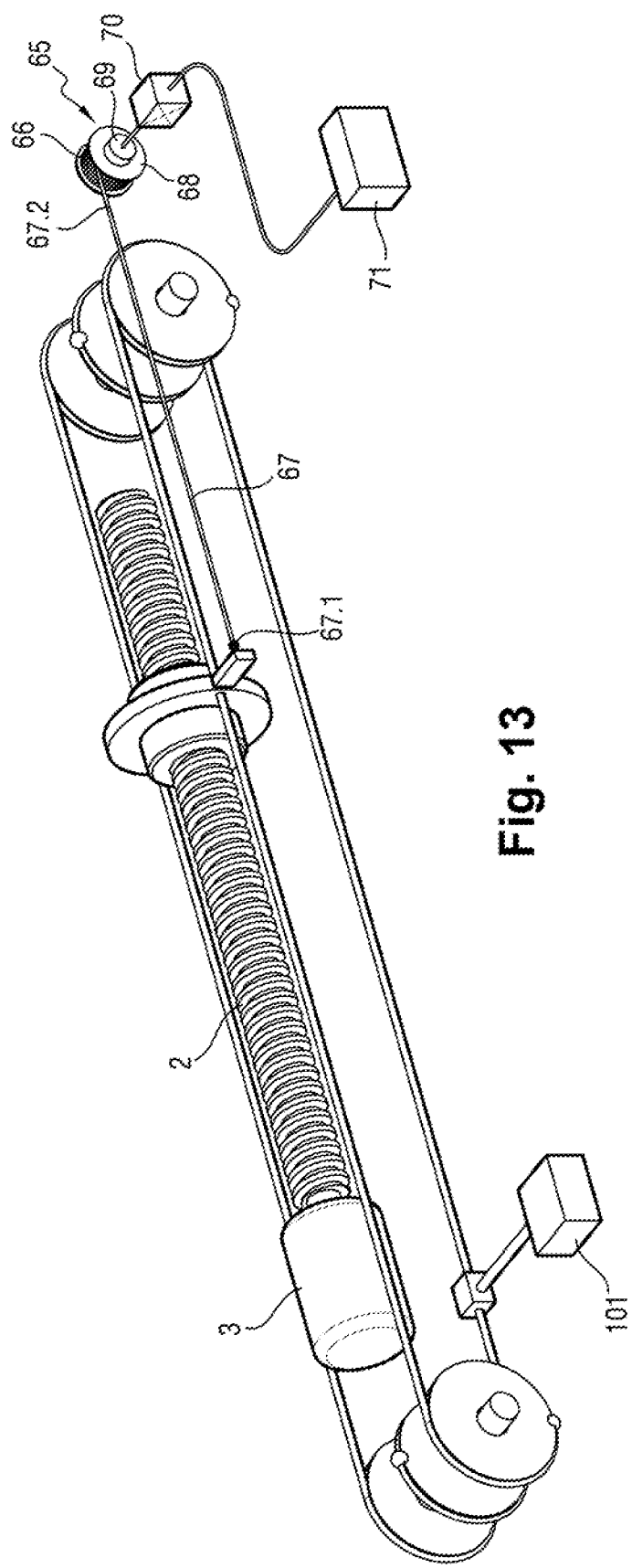
FIG. 13 is a diagrammatic perspective view of an eighth embodiment of the invention.

In an eighth embodiment of the invention, as shown in FIG. 13, a distance sensor 65 having a wire winder 66 is secured to the chassis 10. The wire 67 of the winder 66 has a first end 67.1 connected to the nut 4 and a second end 67.2 connected to a drum 68 of the winder 66. A spiral spring 69 exerts a return force on the drum 68 and serves to maintain permanent tension in the wire 67. A third rotary encoder 70 measures rotation of the drum 68. The third rotary encoder 70 of the distance sensor 65 is connected to a processor unit 71, itself connected to the control unit 90.

In operation, the actual position of the nut 4 on the screw 2 is determined by the number of revolutions of the drum 68 as measured by the third rotary encoder 70. The processor unit 71 measures the rotation of the third rotary encoder 70 and transmits it to the control unit 90. The comparator 92 of the control unit 90 compares the actual position of the end 67.1 with its theoretical position, and it deduces therefrom the variation in the distance between said end 67.1 and the point of the wire 67 that is tangential to the drum 68. By geometrical calculation, the control unit 90 can deduce equally well from the position deviation 54 either an angular position deviation $\delta_{ang4}$ or a linear position deviation $\delta_{lin4}$. The calculation means 93 then determine the force being applied to the support 22.3 by the load 101 as a function of the value $\delta_{ang4}$ for the deviation of the angular position of the nut 4 in the same manner as for the first embodiment of the invention as described above.

Figure 14:
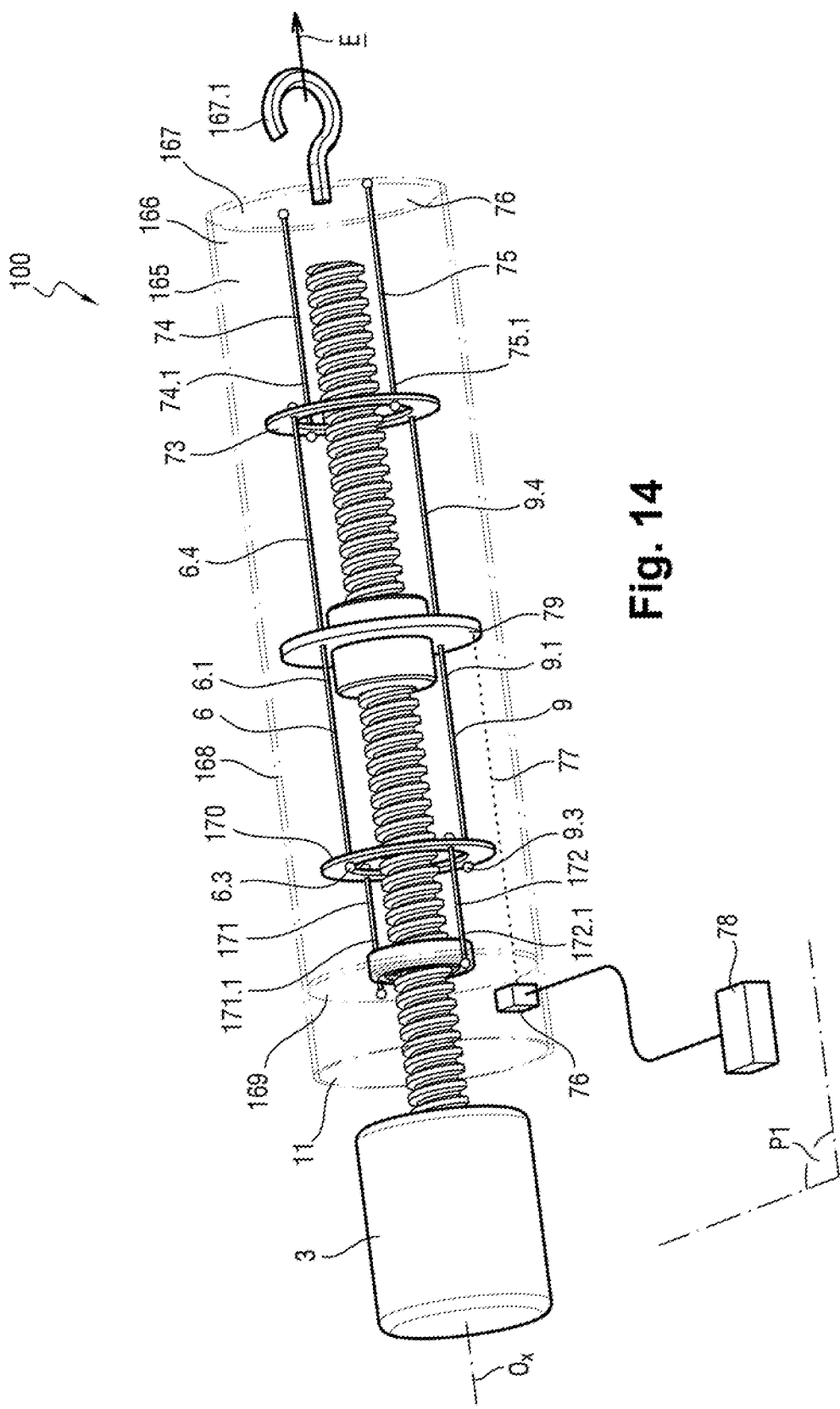
FIG. 14 is a diagrammatic perspective view of a ninth embodiment of the invention.

In a ninth embodiment as shown in FIG. 14, the cable actuator 10 comprises a tube 165 mounted inside the cylinder 11 in order to form a sliding connection via means known to the person skilled in the art and not shown. At its first end 166, the tube 165 has a first transverse face 167 provided with a hook 167.1. The second end 168 of the tube 165 has a second transverse face 169 that is annular.

The cable actuator 100 also has an annular first intermediate support 170 having connected thereto the second ends 6.3 and 9.3 respectively of the first segment 6.1 of the first cable 6 and of the first segment 9.1 of the second cable 9. A first segment 171.1 of a fourth cable 171 and a first segment 172.1 of a fifth cable 172 extend parallel to the first axis Ox in order to connect the first intermediate support 170 with the second transverse face 169 of the tube 165.

The first segment 171.1 and the first segment 172.1 extend on either side of the first axis Ox in a plane P1 containing the first axis Ox. The plane P1 extends substantially orthogonally to a plane P2 containing the first segment 6.1 of the first cable 6 and the first segment 9.1 of the second cable 9.

The cable actuator 100 also has a second annular intermediate support 73 having connected thereto the second ends 6.6 and 9.6 respectively of the second segment 6.4 of the first cable 6 and of the second segment 6.4 of the second cable 9. A first segment 74.1 of a sixth cable 74 and a first segment 75.1 of a seventh cable 75 extend parallel to the first axis Ox in order to connect the second intermediate support 73 with the first transverse face 167 of the tube 165.

The first segment 74.1 and the first segment 75.1 extend on either side of the first axis Ox in the plane P1. The second of segment 6.4 of the first cable 6 and the second segment 9.4 of the second cable 9 extend in the plane P2.

Under drive from the motor 3, rotation of the screw 2 gives rise to identical rotation of the nut 4 as a result of contact friction between the screw 2 and the nut 4. This movement tensions the first cable 6 and the second cable 9, and also the fourth cable 171, the fifth cable 172, the sixth cable 74, and the seventh cable 75. The first cable 6 and the second cable 9 exert forces that oppose the nut 4 being driven in rotation by the screw 2, and these forces are transmitted to the fourth cable 171, to the fifth cable 172, to the sixth cable 74, and to the seventh cable 75. In addition to their functions of transmitting movement forces from the nut 4 to the hook 167.1, the cables 6, 9, 171, 172, 74, and 75 then perform an anti-rotation function such that rotation of the screw 2 under drive from the motor 3 causes the nut 4 to move relative to the screw 2. Thus, the nut 4 moves axially under the effect of the screw 2 rotating, and does so without turning about the first axis Ox.

In this ninth embodiment, a laser beam distance sensor 76 is secured to the cylinder 11. The distance sensor 76 is connected to a processor unit 78, itself connected to the control unit 90. The laser beam 77 of the distance sensor 76 extends in a direction $O_{77}$ that is substantially parallel to the first axis Ox. A reflective disk 79 projects radially from the nut 4. The distance sensor 76 is arranged so that the laser beam 77 is reflected by the disk 79.

The operation of the actuator in the ninth embodiment is identical to the operation of the actuator in the seventh embodiment.

Figure 15:
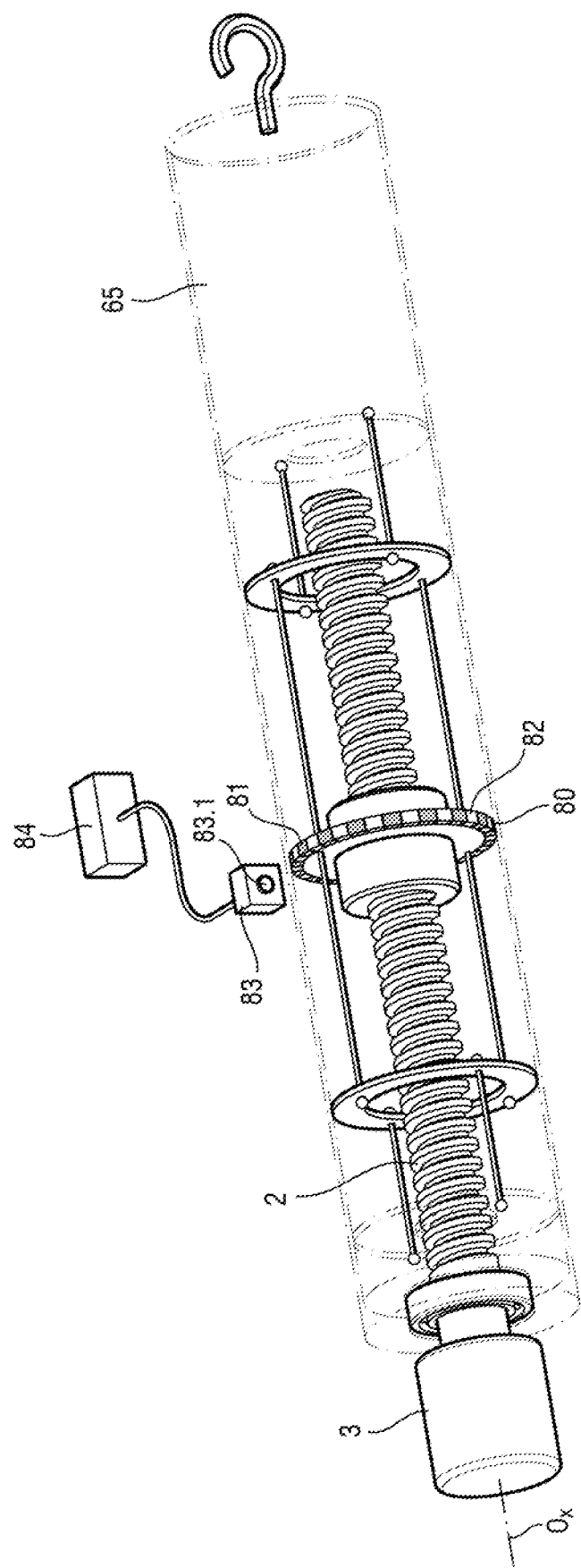
FIG. 15 is a diagrammatic perspective view of a tenth embodiment of the invention.

In a tenth embodiment as shown in FIG. 15, a disk 18 projects radially from the nut 4. The periphery of the disk 80 carries 1800 first magnetic poles 81 of positive polarity alternating with 1800 second magnetic poles 82 of negative polarity. A magnetic sensor 83 secured to the tube 165 possesses a sensor cell 83.1 facing the periphery of the disk 80. The magnetic sensor 83 is connected to a processor unit 84, itself connected to the control unit 90.

In operation, the actual angular position of the nut 4 of the screw 2 is determined by the number of magnetic impulses picked up by the magnetic sensor 83 as generated by the first poles 81 and by the second poles 82. The processor unit 84 measures a number of magnetic pulses picked up by the magnetic sensor 83 and transmits it to the control unit 90. The comparator 92 of the control unit 90 compares the actual angular position of the nut 4 about the axis Ox with the theoretical angular position for the nut 4 about the axis Ox, and by subtraction, the comparator 92 obtains a value $\delta_{ang4}$ for the deviation of the angular position of the nut 4. The calculation means 93 then determine the resultant along the first axis Ox of a force E applied to the hook 167.1 as a function of the value $\delta_{ang4}$ for the deviation of the angular position of the nut 4 in the same manner as described above for the first embodiment of the invention.

Figure 16:
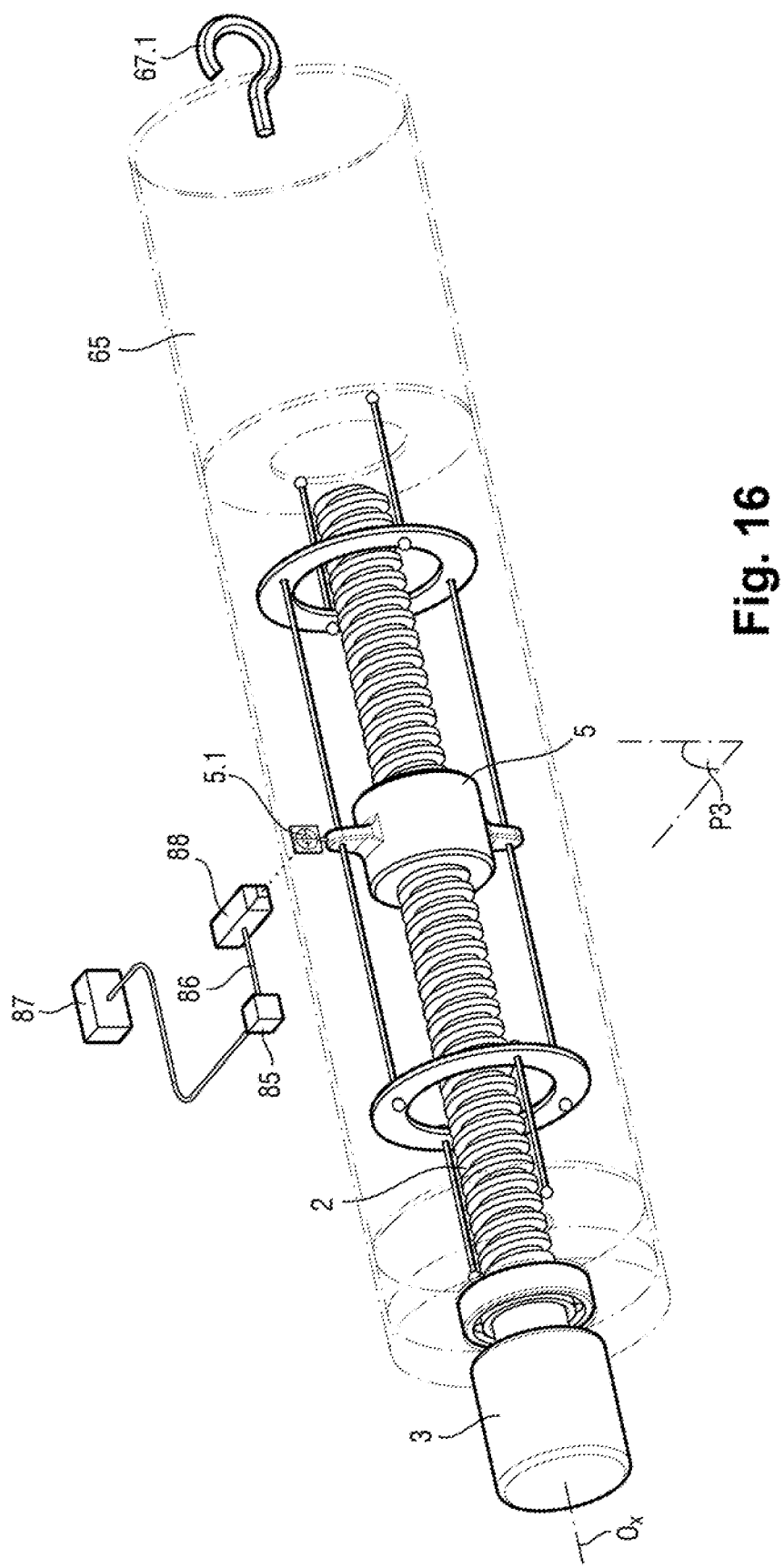
FIG. 16 is a diagrammatic perspective view of an eleventh embodiment of the invention.

In an eleventh embodiment as shown in FIG. 16, a laser beam distance sensor 85 is secured to the cylinder 11. The distance sensor 85 is connected to a processor unit 87, itself connected to the control unit 90. The laser beam 86 from the distance sensor 85 extends along a direction $O_{86}$ lying in a plane P3 orthogonal to the first axis Ox. At its distal end 5.1, the first eyelet 5 carries a target 88. The distance sensor 85 is arranged so that the laser beam 86 is reflected by the target 88.

In operation, the sensor 85 measures the distance $D_{85\text{-}88}$ between itself and the target 88, and it transmits the value of this distance $D_{85\text{-}88}$ to the calculation means 93, which convert it into an actual angular position of the nut 4 about the axis Ox. The comparator 92 compares the actual angular position of the nut 4 about the axis Ox with the theoretical angular position for the nut about the axis Ox, and by subtraction, the comparator obtains a value $\delta_{ang4}$ for the deviation of the angular position of the nut 4.

The calculation means 93 then determine the resultant along the first axis Ox of a force E applied to the hook 167.1 as a function of the value $\delta_{ang4}$ for the deviation of the angular position of the nut 4 in the same manner as described above for the first embodiment of the invention.

Figure 17:
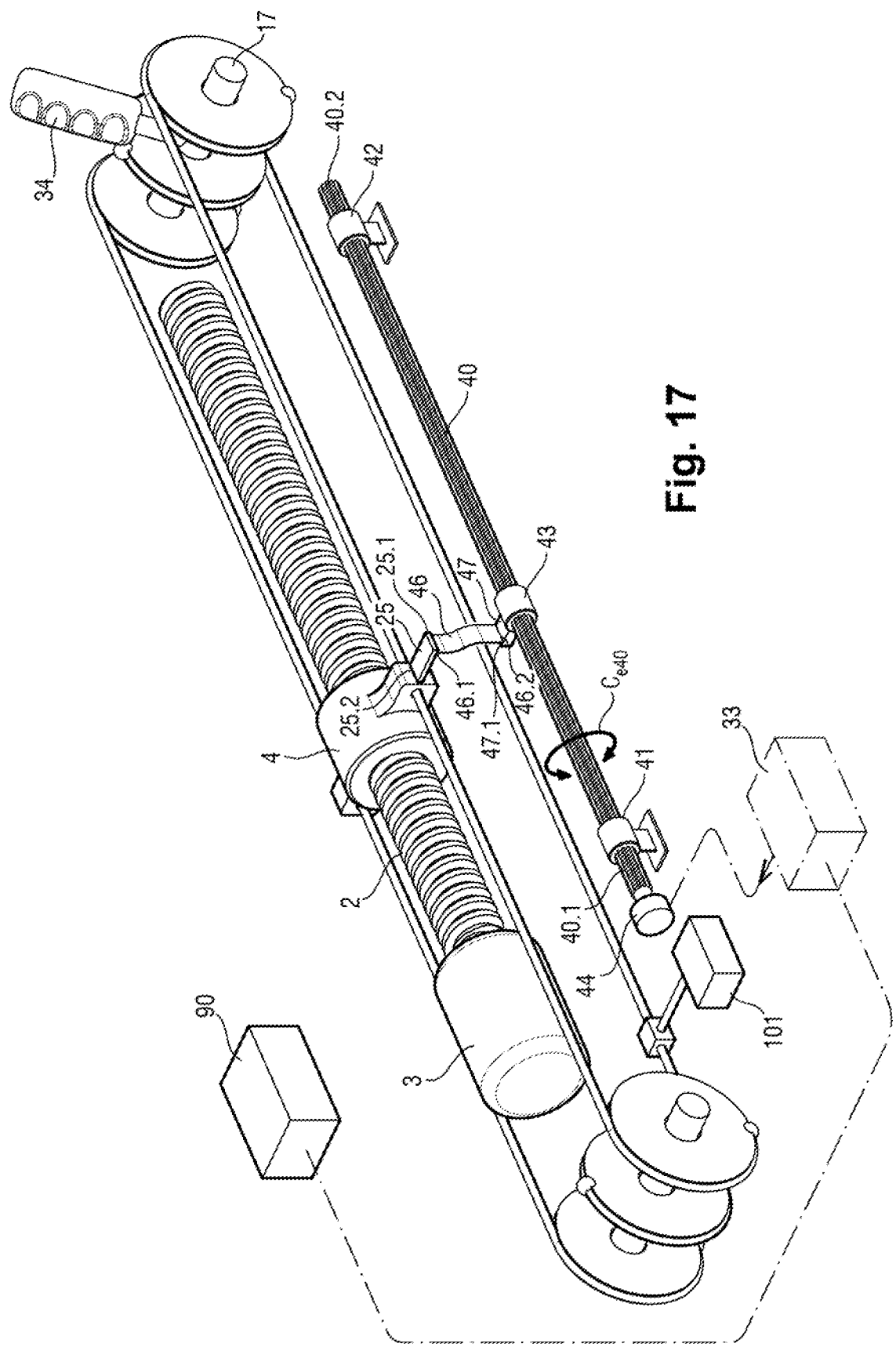
FIG. 17 is a diagrammatic perspective view of a twelfth embodiment of the invention.

In a twelfth embodiment as shown in FIG. 17, the encoder 44 of the third embodiment includes a motor mode. In its motor mode, when an excitation unit 33 connected to the encoder 44 imposes a voltage across the terminals of the encoder 44, the output of the encoder 44 applies an excitation force to the third shaft 40, specifically an excitation torque $Ce_{40}$, which shaft transmits the force to the nut 4. The excitation unit 33 is preferably connected to the control unit 90. The excitation torque $Ce_{40}$ is preferably small and accurately controlled. When applied at high frequency, the excitation torque $Ce_{40}$ serves to simulate or reproduce textures. Thus, with a haptic-return actuator having a handle 34 secured to the second shaft 17, the nut 4 is moved by using the electric motor 3. In motor mode, the encoder 44 applies an excitation torque $Ce_{40}$ to the nut 4 and serves to simulate a texture while the nut 4 is being moved, or to simulate a vibration while the nut 4 is stationary. For example, applying a sinusoidal excitation torque serves to reproduce the sensation of an undulating texture at the handle 34.

This application is particularly useful in the context of an actuator 100 used in a haptic remote-operation device. Specifically, the user of the handle 34 can perceive vibration or textures of changes in roughness that cannot be reproduced by the motor 3.

Figure 18:
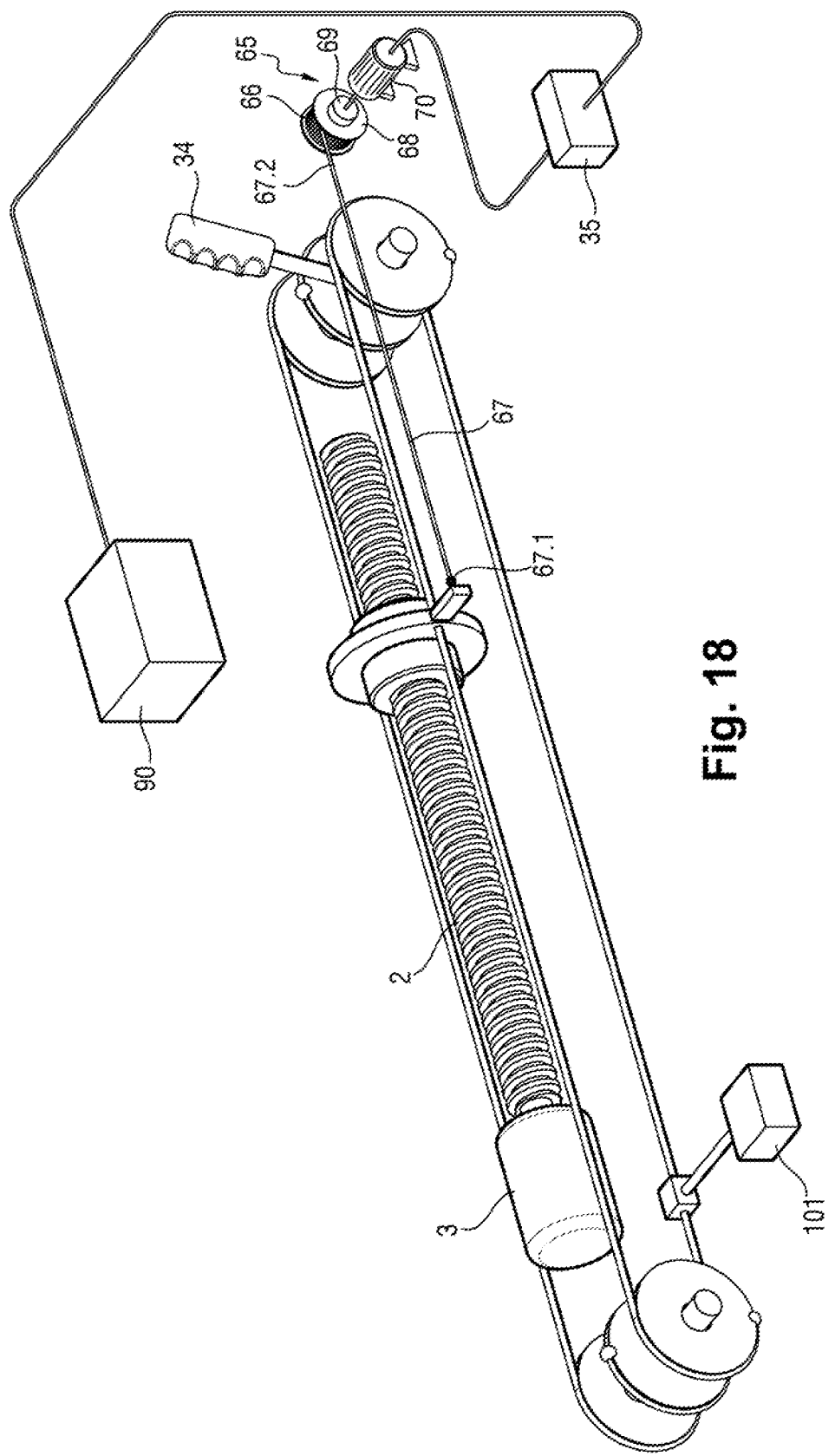
FIG. 18 is a diagrammatic perspective view of a thirteenth embodiment of the invention.

In a thirteenth embodiment as shown in FIG. 18, the third rotary encoder 70 of the distance sensor 65 having the winder 66 in the eighth embodiment of the invention possesses a motor in order to apply a torque on the nut 4. In a manner corresponding to the twelfth embodiment, when an excitation unit 35 connected to the third rotary encoder 70 applies a voltage to the terminals of the third rotary encoder 70, the output of the third rotary encoder 70 applies an excitation force to the wire 67, in this example an excitation tension $Te_{67}$, which wire transmits the force to the nut 4. The excitation unit 35 is preferably connected to the control unit 90. The excitation tension $Te_{67}$ is preferably small and accurately controlled. When applied at high frequency, the excitation tension $Te_{67}$ serves to simulate or reproduce textures, levels of roughness, or vibration.

Figure 19:
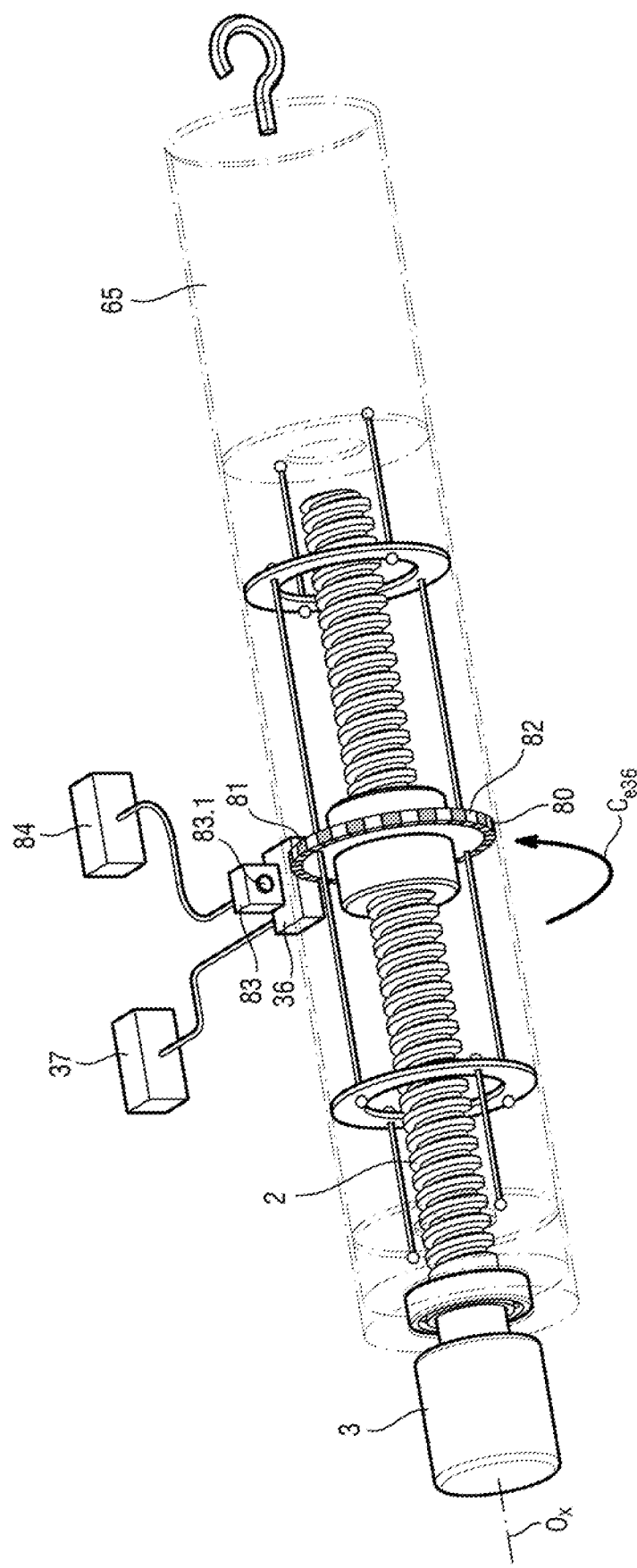
FIG. 19 is a diagrammatic perspective view of a fourteenth embodiment of the invention.

In a fourteenth embodiment as shown in FIG. 19, the actuator 100 of the tenth embodiment also has a magnetic exciter 36 for applying a force on the first magnetic pole 81 or the second magnetic pole 82. Thus, applying a voltage to the terminals of the magnetic exciter 36 serves to exert a force on the nut 4.

In its motor mode, when the exciter unit 37 connected to the magnetic exciter 36 imposes a voltage to the terminals of the magnetic exciter 36, the magnetic exciter applies an excitation force to the disk 80, specifically an excitation torque $Ce_{36}$, which disk transmits the force to the nut 4. The excitation unit 37 is preferably connected to the control unit 90. The excitation torque $Ce_{36}$ is preferably small and accurately controlled. When applied at high frequency, the excitation torque $Ce_{36}$ serves to simulate or reproduce textures. Thus, with a haptic-return actuator having a handle 34 secured to the second shaft 17, the nut 4 is moved by using the electric motor 3. In motor mode, the exciter applies an excitation torque $Ce_{40}$ to the nut 4 and serves to simulate a texture while the nut 4 is being moved, or to simulate a vibration while the nut 4 is stationary. For example, applying a sinusoidal excitation torque serves to reproduce the sensation of an undulating texture at the handle 34.

This application is particularly useful in the context of an actuator 100 used in a haptic remote-operation device. Specifically, the user of the handle 34 can perceive vibration or textures of changes in roughness that cannot be reproduced by the motor 3.

Naturally, the invention is not limited to the above description, but covers any variant coming within the ambit of the invention as defined by the claims.

In particular;

although above, the frame is cylindrical in shape, the invention applies equally well to frames of other shapes, e.g. such as a plate, a square tube, or any arbitrary shape;

although above, the axis of the screw extends horizontally, the invention applies equally well to the axis of rotation of the screw having some other orientation, e.g. such as an orientation that is vertical, at 45°, or at any angle;

although above, the cable actuator has two cables connected to the nut, the invention applies equally well to an actuator in which the nut is connected to a single cable, or to more than two cables;

although above, the output from the cable actuator is connected to a cable in order to deliver movement in translation, the invention applies equally well to an output that is constrained to rotate with one of the shafts of the actuator in order to provide a movement in rotation;

although above, the magnet connected to the nut is a neodymium magnet, the invention applies equally well to other means for inducing a magnetic field, such as for example an electric coil, a ferrite magnet, a magnet of Alnico type, or a samarium-cobalt magnet;

although above, the magnetic field is measured by making use of the Hall effect, the invention applies equally well to other means for measuring magnetism, such as for example a magnetic sensor using the Faraday effect, or a magnetoresistance;

although above, the user acts on a handle in order to control the actuator, the invention applies equally well to other control means, e.g. such as a switch or voice control;

although above, the force being exerted by the actuator is described as being determined while the actuator is stabilized in a given position, the invention applies equally well to measuring the force dynamically while the actuator is moving;

although above, the method of determining prior loading for the cables is described with reference to the first embodiment of the actuator, the method of determining prior loading for the cables applies equally well to the other embodiments of the invention;

although above, the output from the actuator is stationary when the nut is at the second end of the screw, the invention applies equally well to other predetermined positions for the nut (or for the output) relative to the frame;

although above, the actuator comprises a ball screw, the invention applies equally well to other types of screw, e.g. such as a single thread screw or a roller screw;

although above, the reflector is a white-metal sheet, the invention applies equally well to reflectors of other types, such as for example a mirror, a polished sheet, a simple sheet, or any element having a surface that reflects a wave sufficiently to enable its travel time to be measured;

although above, the first shaft is mounted on two ball bearings, the invention applies equally well to other means for rotatably mounting the third shaft on the frame, e.g. such as bronze bushings, needle bearings, ball bearings, or conical roller bearings;

although above, the first shaft is a fluted shaft having a ball bushing mounted thereon, the invention applies equally well to other means for enabling a bushing to slide relative to the third shaft while preventing relative rotation, e.g. such as a fluted shaft and a fluted bushing, a slotted shaft and a bushing carrying a finger that co-operates with the slot, or a flat on the shaft cooperating with a complementary flat of the bushing;

although above, the metal blade is welded on the end of a rod secured to the nut, the invention applies equally well to a blade secured directly to the nut by other connection means, e.g. such as brazing, crimping, screw fastening, and/or adhesive bonding;

although above, the blade is connected to the nut via a ball joint and to the bushing via a fixed connection, the invention applies equally well to the blade being fixed via a fixed connection to the nut and via a ball joint connection to the bushing, and in general manner, the mechanical coupling connections between the first element and the second element (pivot-to-balljoint connections, column-to-ballbushing connections, etc.) may be inverted without going beyond the ambit of the invention;

although above, the mechanical coupling comprises a column slidably mounted in a ball bushing, the invention applies equally well to other means for making a telescopic portion, e.g. such as a fluted shaft slidably mounted in a complementary bushing, a shaft slidably mounted in a bronze bearing;

although above, the actuator includes a laser beam distance sensor, the invention applies equally well to other types of distance sensor comprising a wave transceiver e.g. such as an ultrasound transceiver, a visible light or infrared light transceiver, or indeed incremental or wire distance sensors;

although above, the nut includes a reflecting disk, the invention applies equally well to reflectors of other types, e.g. such as a reflector of some other shape, or a mirror, or an active target;

although above, the cable actuator includes a hook, the invention applies equally well to actuator outputs of other types, e.g. such as a thrust pad, a ring, or a flange;

although above, the cable actuator comprises a disk having 1800 poles of positive magnetic polarity mounted in alternation with 1800 poles of negative magnetic polarity, the invention applies equally well to incremental sensors of other types, e.g. such as incremental sensors having optical points or possessing some other number of magnetic poles, or possessing an alternation of magnetic poles and of non-magnetic poles;

although above, the magnetic sensor is secured to the tube, the invention applies equally well to other ways of managing the sensor relative to the nut, e.g. such as a sensor secured to the cylinder or secured to the frame and having a sensing cell that extends over the entire stroke of the nut;

although above, the target is mounted at the distal end of the eyelet, the invention applies equally well to mounting the target on the nut at other points, e.g. such as on a transverse face of the nut or on the body of the nut;

although above, the first cable is coupled to the nut by being crimped to an eyelet that is secured to the nut, the invention applies equally well to other means for coupling a cable to the nut, e.g. such as a ring welded to the nut, a collet in a hole made in the nut, loops through a hole, fastening to an intermediate support;

although above, the cables extend parallel to the first axis, invention applies equally well to other cable configurations in which a cable can adopt an arbitrary orientation relative to the first axis;

although the first and third pulleys are secured to the same shaft, the invention applies equally well to pulleys mounted on independent shaft;

although above, the first, second, fourth, fifth, sixth, and seventh cables are coupled to the nut via intermediate supports, the invention applies equally well to first, second, fourth, fifth, sixth, and seventh cables that are coupled to the nut directly;

although above, all of the cables of the actuator are prior loaded, the invention applies equally well to a single prior loading cable, to no prior loading cable, or to having only a fraction of the cables prior loaded;

although above, the screw is mounted in a bearing, the invention applies equally well to other means for rotatably mounting the screw on the frame, e.g. such as a bronze bushing, a needle bearing, a ball bearing, or a conical roller bearing;

although above, the method of measuring prior loading is described with reference to the first embodiment of the invention, such a method is clearly applicable to any variant coming within the ambit of the invention as defined by the claims;

although above, the encoder possesses a motor mode for applying forces to the nut, the invention applies equally well to an exciter that does not have an encoding function and for which the only function is to apply a force to the nut.

The invention claimed is:

1. A cable actuator comprising:
a frame;
a screw rotatably mounted on the frame and extending along a first axis;
a nut co-operating with the screw;
a first cable coupled to the nut and functionally connected to an output of the actuator;
a second cable coupled to the nut and functionally connected to the output of the actuator; and
a motor arranged to drive the screw in rotation;
the first cable being arranged to exert forces opposing the nut being driven in rotation by the screw so as to constitute anti-rotation means such that rotation of the screw under drive from the motor causes the nut to move along the screw;
the cable actuator also comprising:
means for determining an actual position of the nut relative to the frame;
means for comparing the actual position of the nut relative to the frame with a theoretical position for the nut relative to the frame in order to obtain a position deviation of the nut; and
means for determining a force applied to the output of the cable actuator as a function of the position deviation of the nut.

2. A cable actuator according to claim 1, wherein the position deviation of the nut is an angular deviation measured about the first axis.

3. A cable actuator according to claim 2, wherein the means for determining the actual position of the nut relative to the frame comprise a linear magnetic core secured to the frame and magnetic field induction means connected to the nut.

4. A cable actuator according to claim 2, wherein the means for determining the actual position of the nut relative to the frame comprise a reflector secured to the frame and a distance sensor connected to the nut.

5. A cable actuator according to claim 4, wherein the distance sensor comprises a wave transceiver.

6. A cable actuator according to claim 2, wherein the means for determining the actual position of the nut relative to the frame comprise a distance sensor secured to the frame and a target connected to the nut.

7. A cable actuator according to claim 6, wherein the distance sensor comprises a wave transceiver.

8. A cable actuator according to claim 2, wherein the means for determining the actual position of the nut relative to the frame comprise a plurality of magnetic poles secured to the nut and a magnetic sensor.

9. An actuator according to claim 8, including a magnetic exciter for applying a force on at least one magnetic pole.

10. A cable actuator according to claim 2, wherein the means for determining the actual position of the nut relative to the frame comprise a mechanical coupling connecting a first element connected to the frame with a second element secured to the nut, the first element comprising:
a third shaft mounted on the frame to rotate about an axis substantially parallel to the first axis;
a bushing slidably mounted on the third shaft and provided with means for preventing relative rotation between the bushing and the third shaft; and
a rotary encoder for measuring rotation of the third shaft.

11. A cable actuator according to claim 10, wherein the mechanical coupling comprises a flexible link.

12. A cable actuator according to claim 11, wherein the flexible link has a first end provided with a ball joint connection with one of the first and second elements, the flexible link having a second end with a fixed connection to the other one of the first and second elements.

13. A cable actuator according to claim 10, wherein the mechanical coupling comprises a rigid connecting rod having a first end provided with a ball joint connection with one of the first and second elements, the connecting rod having a second end provided with a pivot connection with the other one of the first and second elements.

14. A cable actuator according to claim 10, wherein the mechanical coupling comprises a first branch having a first end connected by a ball joint connection to a first end of a second branch, the first branch having a second end secured to one of the first and second elements, and the second branch having a second end secured to the other one of the first and second elements, the second branch including a telescopic portion.

15. A cable actuator according to claim 10, wherein the rotary encoder possesses a motor mode that applies an excitation force to the nut.

16. A cable actuator according to claim 1, wherein the position deviation of the nut is a linear deviation measured along the first axis.

17. A cable actuator according to claim 16, wherein the means for determining the actual position of the nut relative to the frame comprise a distance sensor having a wire winder secured to the frame, one end of a wire of the wire winder being connected to the nut.

18. A cable actuator according to claim 17, wherein the distance sensor possesses a motor mode that applies an excitation force to the nut.

19. A cable actuator according to claim 16, wherein the means for determining the actual position of the nut relative to the frame comprise a distance sensor secured to the frame and a target connected to the nut.

20. A cable actuator according to claim 1, wherein the output of the cable actuator is a shaft rotatably mounted on the frame.

21. A cable actuator according to claim 1, wherein the output of the cable actuator is slidably mounted on the frame.

22. A measuring method for measuring a force applied at the output of a cable actuator comprising:
    a frame;
    a screw mounted on the frame and extending along a first axis;
    a nut co-operating with the screw;
    a first cable coupled to the nut and functionally connected to an output of the cable actuator; and
    a motor arranged to drive the screw in rotation;
    the first cable being arranged to exert forces opposing the nut being driven in rotation by the screw so as to constitute anti-rotation means such that rotation of the screw under drive from the motor causes the nut to move along the screw;
    the measuring method for measuring a force comprising:
    determining an actual position of the nut relative to the frame;
    comparing the actual position of the nut relative to the frame with a theoretical position for the nut relative to the frame in order to obtain a position deviation of the nut; and
    determining a force applied to the output of the cable actuator as a function of the position deviation of the nut.

23. A measuring method according to claim 22, wherein the position deviation of the nut is an angular deviation about the first axis.

24. A measuring method according to claim 22, wherein the position deviation of the nut is a linear deviation along the first axis.

25. A method of determining prior loading of a cable actuator comprising:
    a frame;
    a screw mounted on the frame and extending along a first axis;
    a nut co-operating with the screw;
    a first cable coupled to the nut and functionally connected to the output of the cable actuator; and
    a motor arranged to drive the screw in rotation;
    the first cable being arranged to exert forces opposing the nut being driven in rotation by the screw so as to constitute anti-rotation means such that rotation of the screw under drive from the motor causes the nut to move along the screw;
    the method of determining prior loading comprising:
    bringing the nut to a predetermined position relative to the frame;
    holding the output of the cable actuator stationary;
    controlling the motor so that it applies a predetermined torque to the screw;
    determining an actual position of the nut relative to the frame;
    comparing the actual position of the nut relative to the frame with the predetermined position for the nut relative to the frame in order to obtain a position deviation of the nut; and
    determining the prior loading acting at least on the first cable as a function of the position deviation of the nut.

* * * * *